United States Patent
Fan et al.

(10) Patent No.: US 12,218,501 B1
(45) Date of Patent: Feb. 4, 2025

(54) ADAPTIVE ELECTRIC POWER CAPACITOR SYSTEM

(71) Applicant: Southern States, LLC, Hampton, GA (US)

(72) Inventors: Hua Fan, Cumming, GA (US); Jiyuan Fan, Duluth, GA (US)

(73) Assignee: Southern States LLC, Hampton, GA (US)

( * ) Notice: Subject to any disclaimer, the term of this patent is extended or adjusted under 35 U.S.C. 154(b) by 0 days.

(21) Appl. No.: 18/776,500

(22) Filed: Jul. 18, 2024

Related U.S. Application Data

(60) Provisional application No. 63/584,224, filed on Sep. 21, 2023.

(51) Int. Cl.
*H02J 3/00* (2006.01)
*H02J 3/18* (2006.01)

(52) U.S. Cl.
CPC .............. *H02J 3/0012* (2020.01); *H02J 3/18* (2013.01)

(58) Field of Classification Search
CPC .................................. H02J 3/0012; H02J 3/18
USPC ........................................................ 307/109
See application file for complete search history.

(56) References Cited

U.S. PATENT DOCUMENTS

| 9,581,624 B2 | 2/2017 | Rostron et al. | |
| 10,365,302 B2 | 7/2019 | Rostron et al. | |
| 2016/0054363 A1* | 2/2016 | Rostron | G01R 21/06 324/537 |
| 2018/0210023 A1* | 7/2018 | Rostron | G08C 17/02 |

* cited by examiner

*Primary Examiner* — Hal Kaplan
(74) *Attorney, Agent, or Firm* — Mehrman Law Office; Michael J. Mehrman

(57) ABSTRACT

An adaptive electric power capacitor system includes a number of normally in-service capacitor modules and a number of normally out-of-service reserve capacitor modules. Each capacitor module includes a controller-sensor and a switch allowing the capacitor to be independently switched into or out of service while only momentarily taking the entire capacitor bank out of service during the switching operation. For example, a failed in-service capacitor module may be switched out of service, while a reserve capacitor module is switched into service to replace the failed capacitor module. In addition to providing built-in reserve capacitors, the adaptive capacitor system manages the capacitors for the electric phases taking into account unbalanced reactive power loads among the electric power phases to mitigate the unbalanced reactive power state.

20 Claims, 18 Drawing Sheets ion Ser. No. 63/584,224 filed Sep. 9, 2023, which is incorporated by reference.

ADAPTIVE ELECTRIC POWER CAPACITOR SYSTEM

REFERENCE TO RELATED APPLICATIONS

This application claims filing priority to U.S. Provisional Patent Application Ser. No. 63/584,224 filed Sep. 9, 2023, which is incorporated by reference.

TECHNICAL FIELD

The present invention is directed to electric power distribution systems and, more particularly, to an adaptive electric power capacitor system providing reserve capacitors and three-phase reactive power balancing.

BACKGROUND OF THE INVENTION

Capacitor banks are widely used in modern electric power grids for power factor correction to reduce volt-ampere reactive power (VAR) and improve economic efficiency. A substation providing power factor correction for a three-phase power line includes one or more capacitor banks for each electric power phase. Smaller pole mounted capacitor banks are located along distribution lines throughout electric power distribution systems. Each capacitor bank includes a number of capacitor units, commonly referred to as "cans." Each capacitor unit includes a number of capacitor packs which, in turn, include a large number of individual capacitors. In conventional power factor correction, a capacitor bank for a particular electric power phase is switched on or off in response to reactive power changes on its associated electric power phase.

A conventional capacitor bank has a fixed number of capacitor units, each providing a fixed amount of capacitance. The capacitor bank is either switched on or off, with no flexibility in the capacitance of the capacitor units or number of capacitor units switched in or out of service. A fault may occur in only one capacitor unit in a capacitor bank due to a failed capacitor, internal short circuit or a blown fuse. As multiple individual capacitors of a capacitor unit fail over time, the cumulative effect eventually reaches the point where the entire capacitor unit fails. When a capacitor unit experiences a fault, the affected capacitor bank may be automatically taken out of service by a protection relay that trips to avoid possible explosion of the faulted capacitor unit or a cascading fault causing other healthy capacitor units to fail.

Once a single-phase capacitor bank drops out of service, matching capacitor banks for the other phases are also taken out of service to maintain three-phase reactive power balance. As a result, failure of a single capacitor unit may trip an entire three-phase set of capacitor banks out of service. In many cases, the tripped capacitor banks may be the only capacitor banks available in a substation or pole mounted capacitor bank leaving a substantial section of a distribution power line without power factor correction during the ensuing capacitor outage. Once the affected capacitor banks are taken out of service, significant time and effort is required to identify and replace one or more faulted capacitor units, leading to a prolonged three-phase capacitor outage often extending for a number of days. A need exists for more effective and efficient techniques for detecting and replacing failed capacitors on electric power distribution circuits while minimizing or avoiding service interruptions.

In addition, the capacitor banks for the three-phase electric power lines are typically switched together causing the same number of capacitor banks to be connected to each phase. However, the underlying reactive power load can be unbalanced among the phases. Conventional three-phase capacitor bank switching fails to provide unbalanced three-phase power factor correction taking into account unbalanced reactive power loads among the electric power phases. A need therefore exist for three-phase power factor correction to mitigate unbalanced reactive power loads among the electric power phases.

SUMMARY THE INVENTION

The invention may be embodied in an adaptive electric power capacitor system including adaptive capacitors that each include a capacitor module, a bypass switch operatively connected in parallel with the capacitor module, and a controller-sensor. The controller-sensor monitors capacitor data of the capacitor module and controls the bypass switch to selectively switch the capacitor module between in-service and out-of-service states. One or more of the adaptive capacitors are operated as normally in-service, and one or more of the adaptive capacitors operated as normally out-of-service, also referred to as reserve. A capacitor controller receives the capacitor data for the in-service adaptive capacitors and, based on the capacitor data, determines that one of the in-service adaptive capacitors has failed. The capacitor controller then causes the controller-sensor for the failed adaptive capacitor module to switch the failed capacitor module out-of-service, and causes the controller-sensor for a selected reserve adaptive capacitor module in-service to replace the failed adaptive capacitor module. The failed capacitor may then be replaced during a convenient off-peak period.

In a three-phase embodiment, the capacitor controller receives the capacitor data for the in-service adaptive capacitors for each electric power phase and, based on the capacitor data, determines that an unbalanced reactive power state has occurred among the electric power phases. In response, the capacitor controller causes the controller-sensor for one or more adaptive capacitor modules to switch to provide three-phase power factor correction to mitigate the unbalanced reactive power state.

It will be understood that specific embodiments may include a variety of features in different combinations, as desired by different users. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which.

DETAILED DESCRIPTION

The invention may be embodied in an adaptive electric power capacitor system including one or more normally in-service adaptive capacitor modules and one or more normally out-of-service reserve adaptive capacitor modules. Each adaptive capacitor module includes a controller-sensor and a switch allowing the capacitor to be independently switched into or out of service. If circuit breaker switching is desired during the capacitor switching process, the circuit breaker is only opened momentarily taking the entire capacitor bank out of service during the switching operation. For example, a failed in-service capacitor module may be switched out of service, while a reserve capacitor module is switched into service to replace the failed capacitor module. In addition to providing built-in reserve capacitors, the adaptive capacitor system manages the capacitors for the electric phases taking into account unbalanced reactive power loads among the electric power phases to mitigate the unbalanced reactive power state. As circuit breaker switching may be advantageous for some capacitor switching processes but not others, capacitor switching may be considered optional for this disclosure.

Figure 1A:
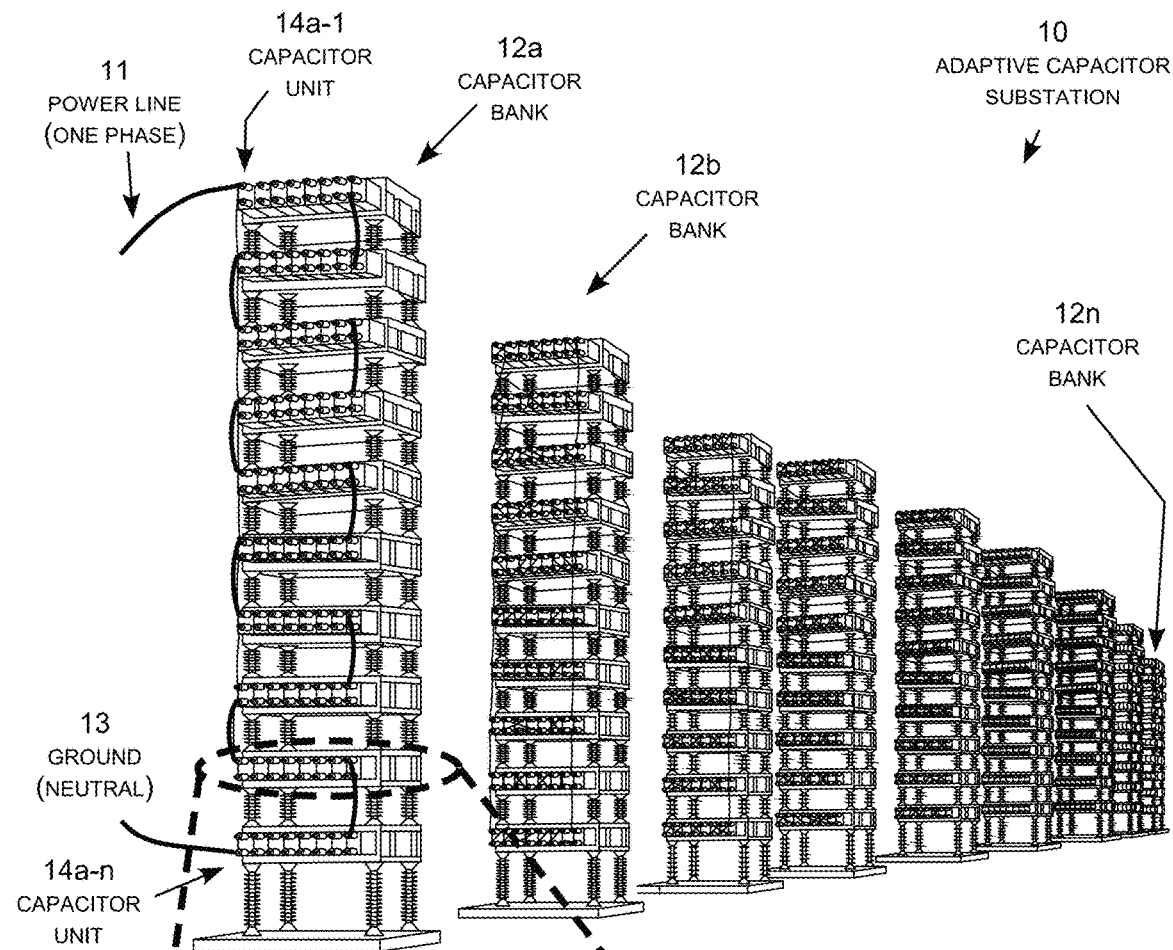
FIG. 1A is a perspective conceptual illustration of an adaptive capacitor electric power substation including multiple capacitor banks for each phase of a three-phase power line.

FIG. 1A is a perspective conceptual illustration of an adaptive capacitor substation 10 serving a three-phase power line, of which one electric power phase 11 is illustrated. The adaptive capacitor substation 10 includes multiple capacitor banks 12a through 12n, which may be iterations of the same capacitor bank for this purpose of this disclosure. As these figures are conceptual, they are simplified and omit many details not relevant to the present invention. In this high-level conceptual illustration, many of the inter-capacitor connections are not depicted to avoid cluttering the figure. In general, for the purpose of this disclosure, each capacitor bank includes a number of capacitor levels, which each include a number of capacitor units, which each include a large number of individual capacitors. The capacitors units may be electrically connected in series to create a electric ladder of capacitor units between the electric power phase 11 and electric ground or neutral 13. As this is a conceptual illustration, it will be understood that practical capacitor substations and banks may vary in electrical connection and other implementation specifics.

Figure 1B:
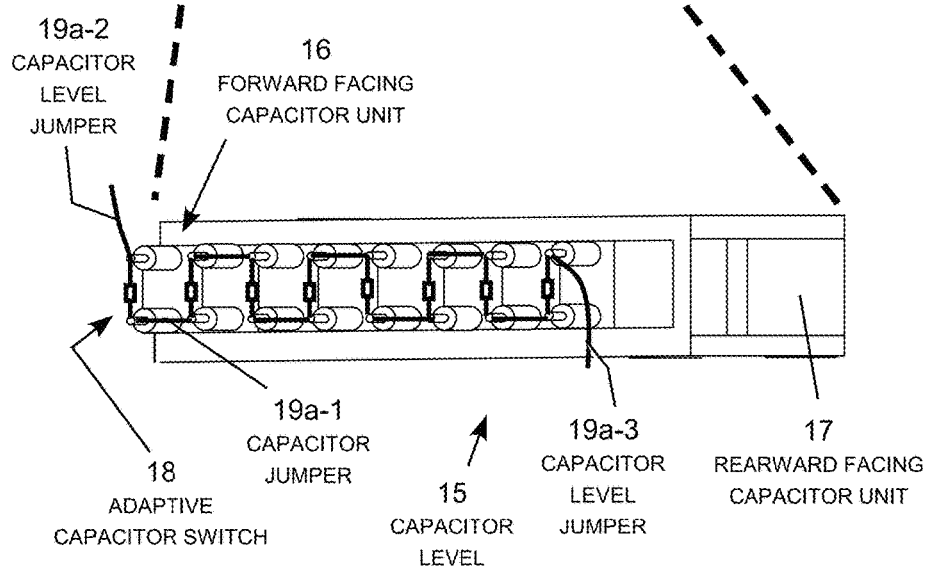
FIG. 1B is an enlarged illustration of a representative capacitor level of an adaptive capacitor bank.

FIG. 1B is an enlarged illustration of a representative capacitor level 15 of the representative capacitor bank 12a shown in FIG. 1A. In this example, the capacitor level 15 includes an array of forward facing capacitor units represented by enumerated the forward facing capacitor unit 16, along with an array of rearward facing capacitor units represented by the enumerated rearward facing capacitor unit 17. In this example, all the capacitor units are adaptive as indicated by the enumerated adaptive capacitor switch 18 connected across the power terminals of the enumerated forward facing capacitor unit 16. The adaptive capacitor units are electrically connected in series as indicated by the enumerated capacitor jumper 19a-1. Similarly, the capacitor level 15 is electrically connected in series with the levels above and below as indicated by the enumerated capacitor level jumpers 19a-2 and 19a-3. Although all of the capacitor units in the capacitor level 15 are depicted as adaptive capacitor units, only a portion of the capacitor unit may be adaptive. Similarly, although all of the capacitor units and levels are depicted as connected in series, other electrical connection schemes may be utilized as a matter of design choice.

In this representative example, the adaptive capacitor substation 10 includes nine capacitor banks, which may be organized as three capacitor banks for each electric power phase. A variety of adaptive capacitor and electrical connection schemes may be employed as a matter of design choice. One or more levels of a capacitor bank may include adaptive capacitors, while the other levels contain conventional. For example, two capacitor banks for each phase may be conventional, while the third is an adaptive capacitor bank. As another example, the top four levels of capacitor bank may include adaptive capacitors, while, the remaining levels include conventional capacitor units. For the purpose of the disclosure, the representative capacitor bank 12a includes 10 levels, each level with 16 adaptive capacitor units, for a total of 160 adaptive capacitor units connected in series. The adaptive capacitor units 14a-1 through 14a-n may be iterations of the same adaptive capacitor unit connected in series between the electric power phase 11 and electric ground or neutral 13. This connection scheme produces voltage and VAR ratings for the representative capacitor bank 12a equal to the sum of the voltage and VAR values of the individual adaptive capacitor units connected in series. A typical adaptive capacitor unit provides, for example, 200 kVAR at 3.5 kV. 160 of these capacitor units connected in series thus produces an adaptive capacitor bank conceptually rated at 32 MVAR and 560 KV.

Figure 2:
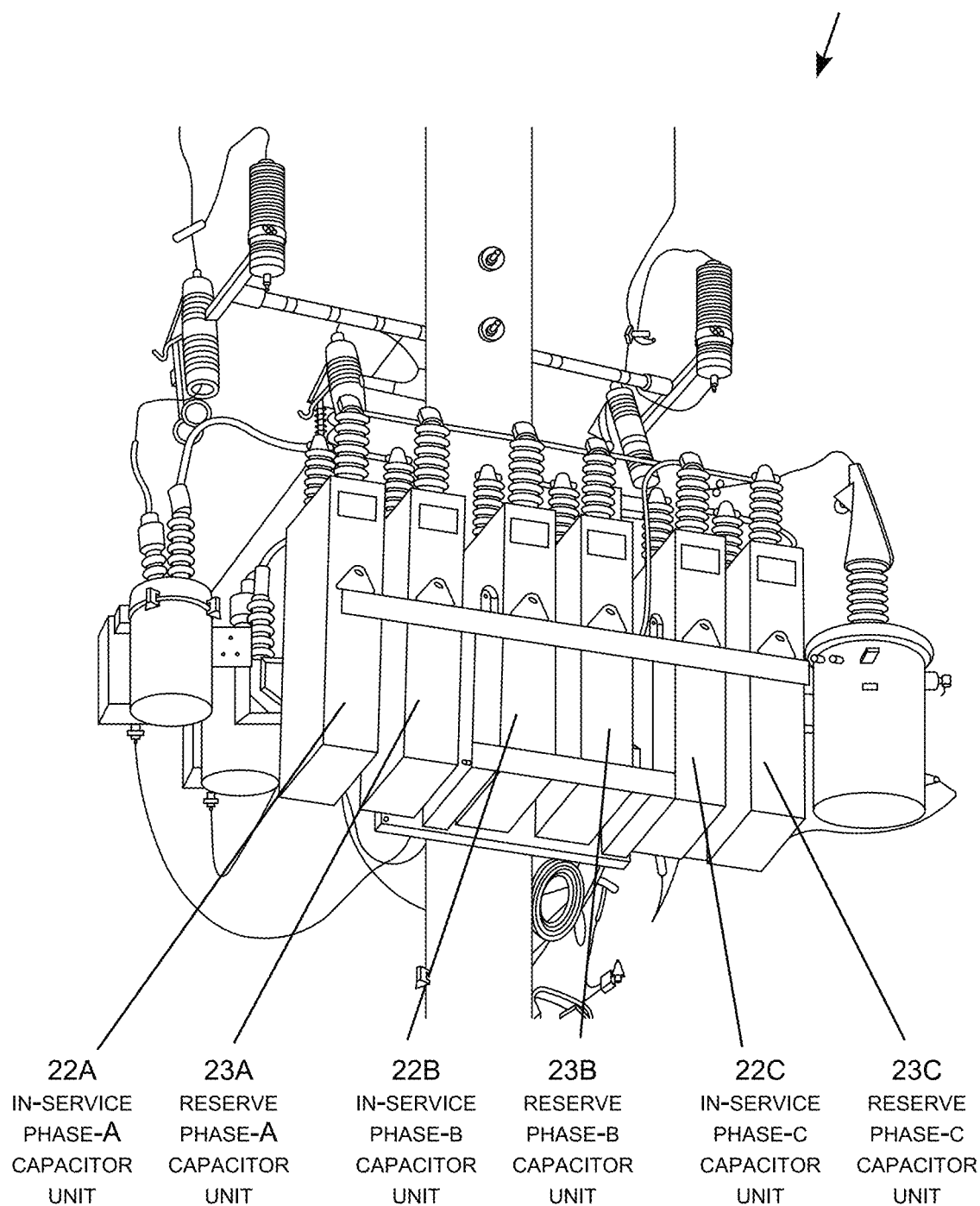
FIG. 2 is perspective conceptual illustration of a pole mounted capacitor bank.

FIG. 2 is a perspective conceptual illustration of a pole-mounted adaptive capacitor bank 20. In general, capacitor banks range from hundreds of capacitor units for large substations, as shown in FIG. 1A, to a few capacitor units for pole-mounted line capacitor configurations as shown in FIG. 2. The representative pole-mounted adaptive capacitor bank 20 includes an in-service phase-A adaptive capacitor 22A and a reserve phase-A adaptive capacitor 23A; an in-service phase-B adaptive capacitor 22B and a reserve phase-B adaptive capacitor 23B; and an in-service phase-C adaptive capacitor 22C and a reserve phase-C adaptive capacitor 23C. For the purpose of the present disclosure, the operation of the pole mounted capacitor bank is functionally similar to the substation capacitor banks shown in FIGS. 1A-1B on a smaller scale. A typical electric power distribution utility may operate, for example, on the order of tens of capacitor substations and hundreds or thousands of pole mounted capacitor units.

In a conventional capacitor bank, each bank has the same number of capacitor unit providing the same rated capacitance for each bank. Conventional capacitor banks are switched on and off in three-phase groups, one for each electric power phase, to maintain balance in the connected capacitance across the phases. In adaptive capacitor systems, each adaptive capacitor bank includes a number of in-service adaptive capacitors and a number of reserve adaptive capacitors that can be individually switched in and out of service, typically by remote control from a local master or consolidated capacitor controller. This allows the capacitance of each capacitor bank to be controlled independently allowing failed capacitor units to be switched out of service, and reserve capacitor units to be switched into service, in response to detected capacitor unit failures. Rather than an extended multi-hour or multi-day outage for conventional replacement of a failed capacitor unit, the adaptive capacitor banks are only taken out of service, if at all, momentarily during the adaptive capacitor switching process. Eventually, during a convenient low-load period, the failed adaptive capacitor units are removed and replaced. This approach produces advantages from consolidated, systemwide capacitor management, including avoidance of capacitor outages, real-time capacitor monitoring across the electric utility system, consolidated capacitor inventory management, strategic capacitor procurement, strategic dispatch of capacitor repair crews, off-peak capacitor replacement, systemwide capacitor failure research, and so forth.

The adaptive capacitor units can also be switched into and out of service independently in response to detected reactive power imbalances across the underlying reactive power loads to provide three-phase power factor correction to mitigate unbalanced three-phase loads. Conventional capacitor banks do not operate in this manner.

While the amount of reserve capacitance is reduced, the same control advantages may be gained by adaptively controlling only a portion of the capacitors in each bank. Any number of the capacitor units in a particular capacitor bank may therefore be deployed as adaptive capacitor units, with other capacitor units remaining conventional. FIG. 1 may thus represents a retrofit conversion of conventional capacitor banks into adaptive capacitor banks in which some, but not all, of the capacitor units are adaptive. For example, one or more levels of the capacitor banks 12a-12n could be implemented as adaptive capacitor units giving the capacitor bank a portion of independently switched capacitor units in addition to a portion of conventional capacitor units. As another example, a separate bank of adaptive capacitor units may be installed alongside and electrically connected to an existing capacitor bank to retrofit convert the conventional capacitor bank into an adaptive capacitor bank.

As another example, many conventional pole-mounted capacitor banks only include one to a few capacitor units per phase. In this case, all or a portion of the conventional capacitor units may be converted into adaptive capacitor units. As another option, one or more adaptive capacitor units may be added to the existing capacitor units to convert the conventional pole-mounted capacitor bank into an adaptive three-phase capacitor bank. To provide a few representative examples, depending on the physical configuration of the capacitor bank, additional adaptive capacitor units may be mounted to the same frame supporting the conventional pole-mounted capacitor bank, a larger frame may be installed, or the added adaptive capacitors may be mounted to a separate frame connected to the same pole.

Figure 3:
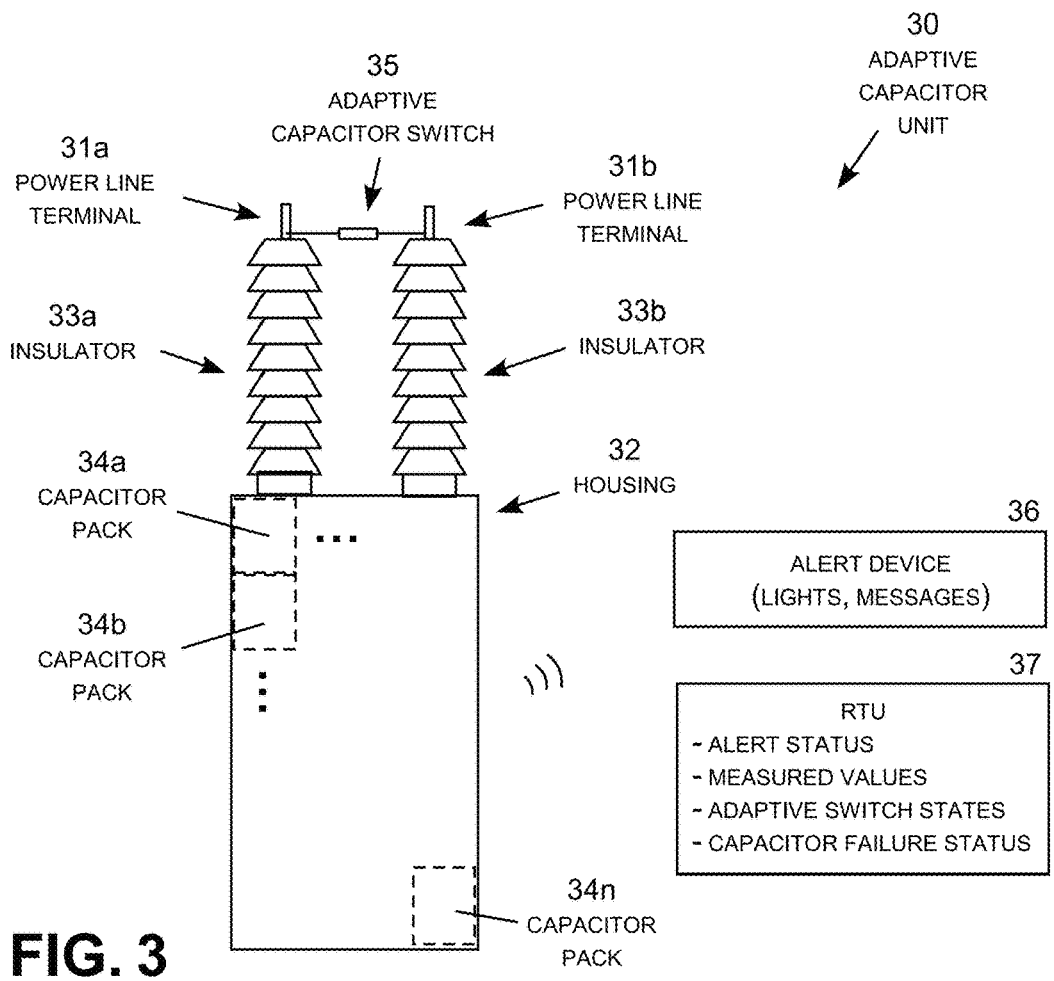
FIG. 3 is a conceptual illustration of an adaptive capacitor unit.

FIG. 3 is a conceptual illustration of a representative adaptive capacitor unit 30. The adaptive capacitor unit 30 includes power line terminals 31a and 31b connected to a capacitor housing 32 by respective insulators 33a and 33b. The housing encloses a large number of capacitor packs 34a through 34n, which may be individually fused and connected in series, in parallel, or series-parallel. Each capacitor pack, in turn, includes a large number of capacitor cells, which may be individually fused and connected in series, parallel or series-parallel. Each capacitor cell, in turn, includes a large number of individual capacitors, which may be individually fused and connected in series, parallel or series-parallel. A particular adaptive capacitor may therefore have any suitable connection arrangement producing the desired voltage and VAR ratings. This example adaptive capacitor unit 30 includes an electronic adaptive capacitor switch 35 electrically connected between and physically supported by the power line terminals 31a and 31b.

The representative adaptive capacitor unit 30 communicates alert information to an alert device 36, which includes, for example, an indicator panel and/or messaging system communicating alert notifications to technicians responsible for maintaining the adaptive capacitor system. Alerts indicating adaptive capacitor failure status may be displayed on a local indicator panel and transmitted to a consolidated capacitor management system. Alert types and recipients may be user-defined settings of the capacitor management system. A representative example capacitor alert system is described in U.S. Pat. No. 10,365,302, which is incorporated by reference.

Figure 6:
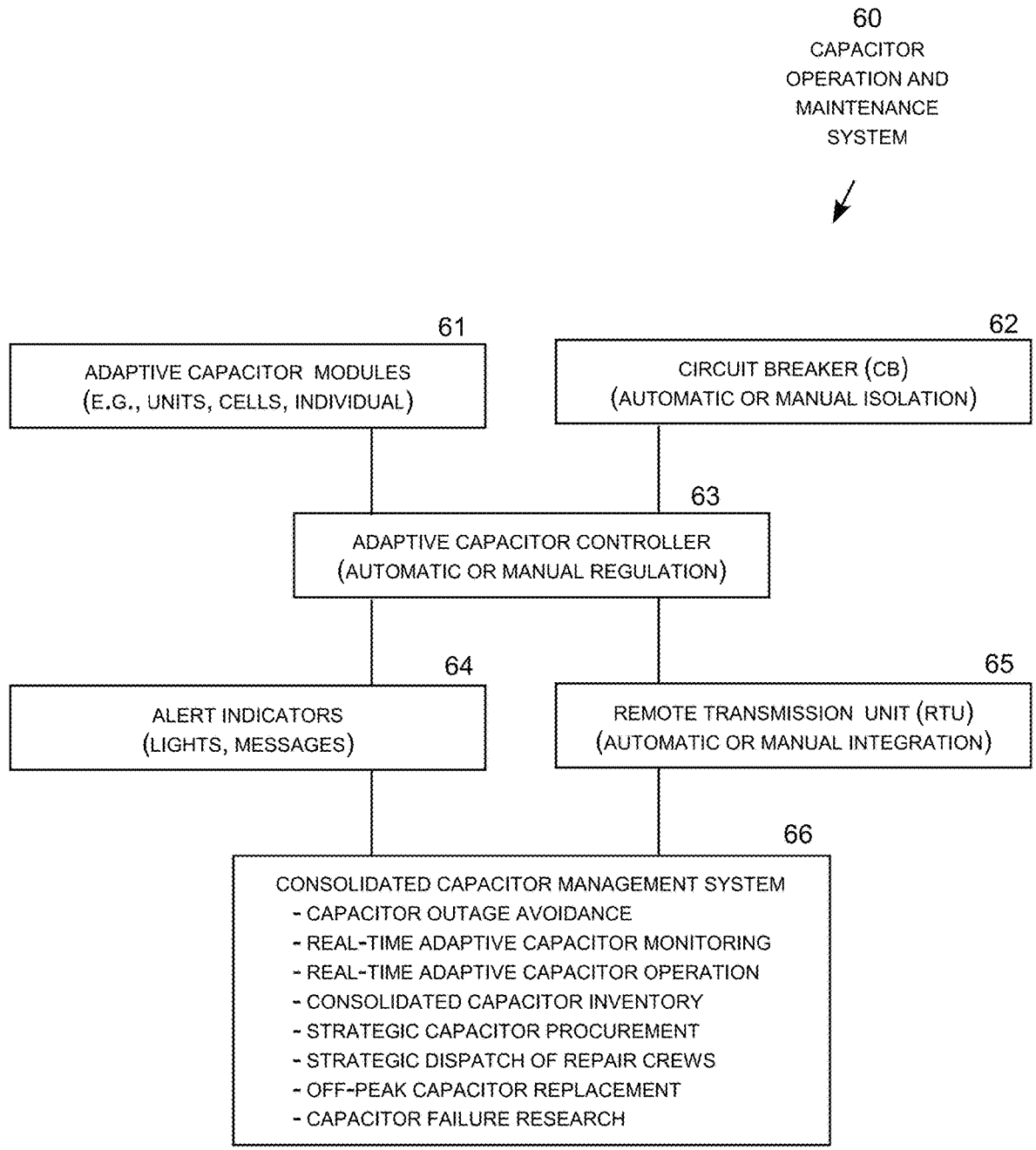
FIG. 6 is a logic flow diagram for a capacitor operation and maintenance system.

In a capacitor management system, the adaptive capacitor unit 30 transmits a variety of capacitor data to a local master or remote consolidated capacitor controller. For example, the capacitor data may include alert status along with measured values (e.g., voltage, current, voltage-current phase angle, capacitance measurements) or parameters based on the measured values. Capacitor data types and recipients may be user-defined settings of the capacitor management system. In the example illustrated in FIG. 3, the C/S 43 communicates alert data wirelessly with a local alert device 36, and also transmits capacitor data to an RTU 37, which relays the capacitor data to a remotely located consolidated capacitor system as shown in FIG. 6.

Figure 4:
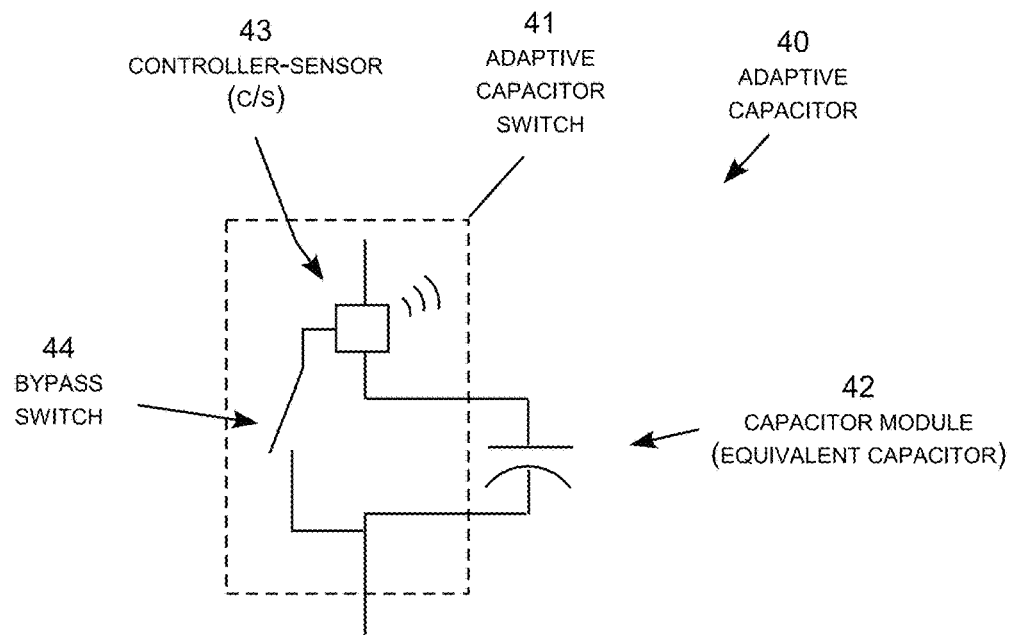
FIG. 4 is a one-line diagram of an adaptive capacitor.

FIG. 4 is a one-line diagram of an adaptive capacitor 40 including an adaptive capacitor switch 41 and a capacitor module 42. The adaptive capacitor switch 41 includes a controller-sensor (C/S) 43 and a bypass switch 44 connected in parallel with the capacitor module. The capacitor module 42 may be any arrangement of series, parallel, or series-parallel connected individual capacitors switched as a unit of capacitance. The capacitor module 42 may therefore be treated as an equivalent capacitor for monitoring and control purposes. The C/S 43 continuously measure and continually report capacitor data, such as voltage, current, voltage-current phase angle, and capacitance of the capacitor module 42. The C/S 43 also monitors and controls the open-closed state of the bypass switch 44. When closed, the bypass switch 44 electrically shorts the capacitor module 42 taking it out of service. When open, the bypass switch 44 allows electric current to flow through the capacitor module 42 placing it in service. The C/S 43 communicates with other monitoring and control devices directly and/or indirectly, for example by way of an RTU, through any suitable communication links.

Although the C/S 43 is depicted as a single device in FIG. 4, practical embodiments may include an arrangement of physical devices. For example, a voltage sensor, current sensor, controller, wireless communication device, and power supply may be separate physical devices, with the combination represented by the C/S 43 as a single element for illustrative convenience. The C/S 43 may harvest and store electrical power from the power line as described in U.S. Pat. No. 10,365,302, which is incorporated by reference. The various C/S units may communicate with each other in a peer-to-peer or mesh control scheme as described in U.S. Pat. No. 9,581,624, which is incorporated by reference, with the master controller providing supervisory control over a wide ranging system of adaptive capacitor modules. The master controller may be physically local or remote to the adaptive capacitor system. The master controller may implement or communicate with a consolidated capacitor management system providing supervisory control over the adaptive capacitor modules in many physical locations. Any computerized controller in this disclosure may be local or remote, discrete or distributed, dedicated to a particular adaptive capacitor system, or consolidated.

Figure 5A:
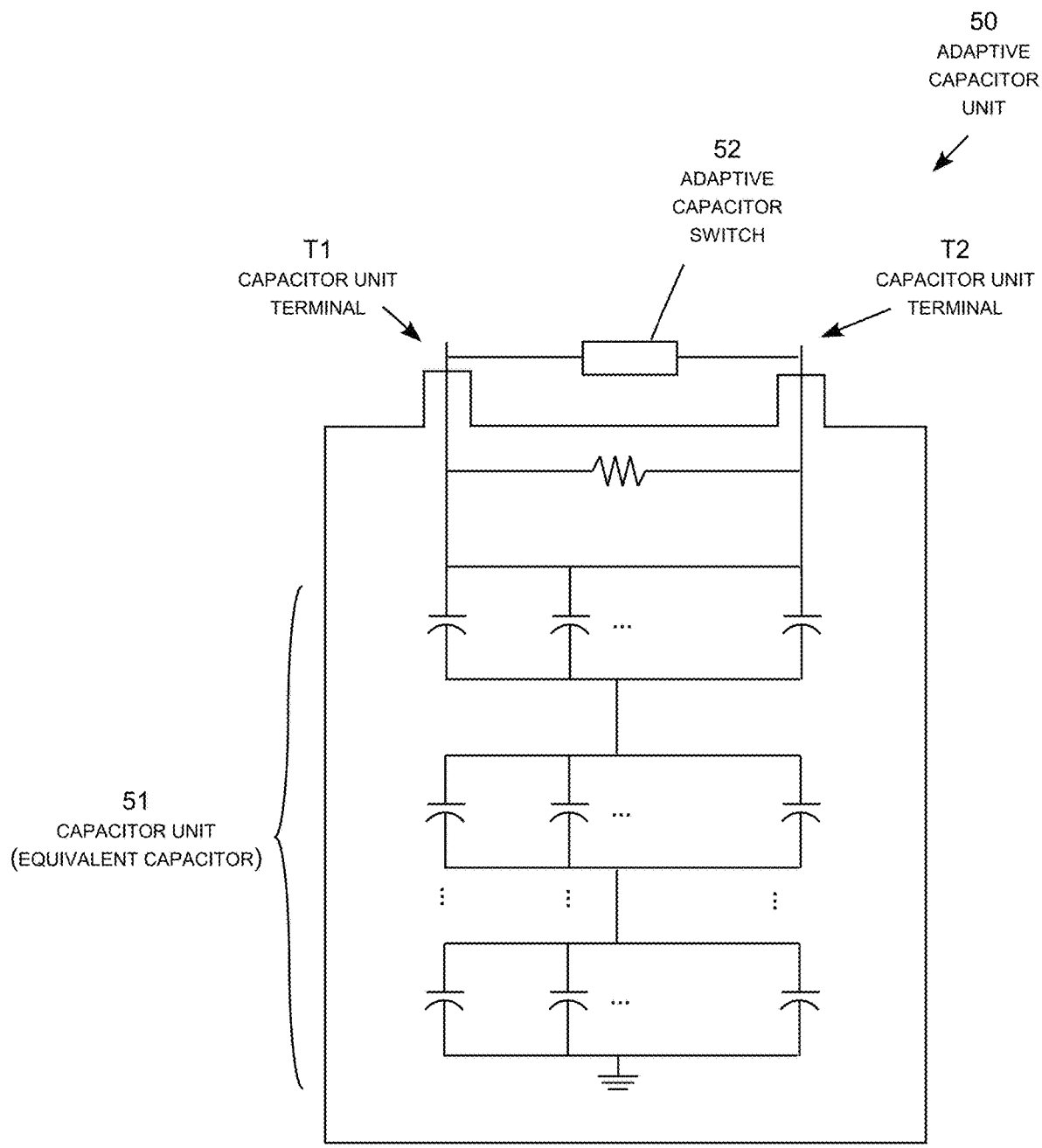
FIG. 5A is one-line diagram of an adaptive capacitor unit.
Figure 5B:
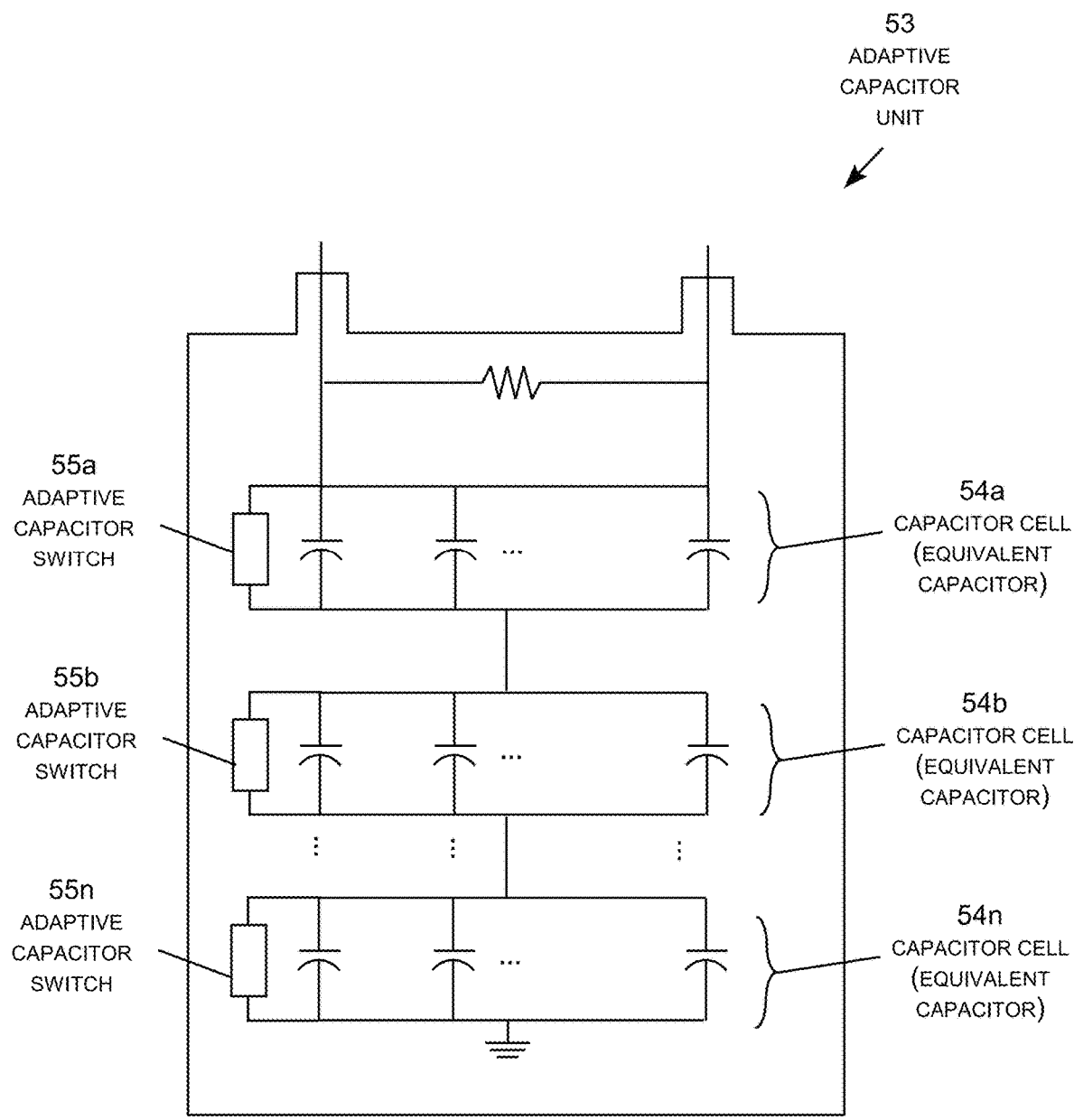
FIG. 5B is one-line diagram of an alternative adaptive capacitor unit.
Figure 5C:
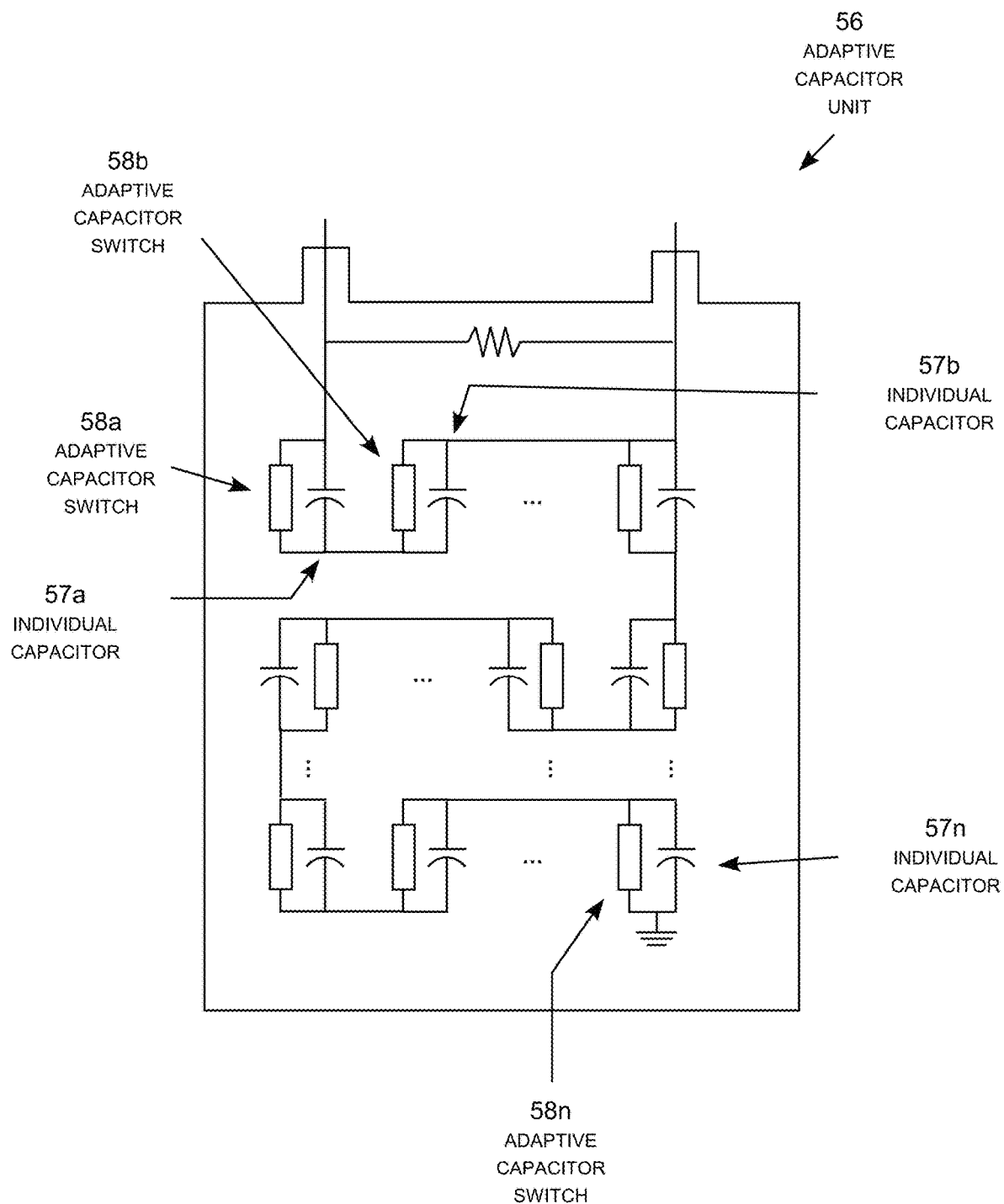
FIG. 5C is one-line diagram of another alternative adaptive capacitor unit.

FIGS. 5A-5C illustrate various examples of adaptive capacitor units providing different equivalent capacitor configurations. While representative, these examples are not intended to provide an exhaustive set of potential configurations. In addition, the individual capacitors, capacitor cells, or capacitor units of each embodiment may be, but need not be, deployed in a common housing. FIG. 5A is one-line diagram of an adaptive capacitor unit 50, in which an adaptive capacitor switch 52 is connected across the power line terminals T1, T2 of an otherwise conventional capacitor unit 51. This allows a conventional capacitor unit to be readily converted into an adaptive capacitor unit. Once converted, the adaptive conventional capacitor unit 51 can be switched independently switched, typically by remote control, between in-service and out-of-service states. For example, the adaptive capacitor unit 50 may be operated as a normally in-service (adaptive capacitor switch 52 open) or a normally reserve (adaptive capacitor switch 52 closed) capacitor unit. Adaptive capacitors may be fungible allowing them to be switched between normally in-service and normally reserve operation, temporarily or long term, in real-time on an as-needed basis to meet the changing reactive power needs of a power line or other load served by the adaptive capacitor unit. As the adaptive capacitor switch 52 may be physically supported by the power line terminals T1, T2 of the capacitor unit, no additional space is required to convert a conventional capacitor unit into an adaptive capacitor unit. This facilitates retrofit modification of existing capacitor banks without any modification other than attachment of adaptive capacitor switches across the power line terminals of the existing capacitor units. The adaptive capacitor unit 50 therefore fits into existing capacitor banks and frames without modification other than addition of the adaptive capacitor switch. Once installed, the adaptive capacitor switch 52 monitors and controls the capacitor unit 51, which is treated as an equivalent capacitor for monitoring and control purposes. As noted previously, this is a highly practical retrofit embodiment.

Although FIG. 5A illustrates the most practical embodiment for many existing capacitor banks, other adaptive capacitor configurations may be deployed. For example, FIG. 5B is one-line diagram of an alternative adaptive capacitor unit 53, in which each internal multi-capacitor cell 54a-54n within the adaptive capacitor unit is monitored and controlled by a respective adaptive capacitor switch 55a-55n. In other words, each internal multi-capacitor cell, such as a capacitor pack, is monitored and controlled as an independent equivalent capacitor. Similarly, FIG. 5C is one-line diagram of another alternative adaptive capacitor unit 56. In this embodiment, each individual capacitor 57a-57n is monitored and controlled by a respective adaptive capacitor switch 58a-58n. In the case, each individual capacitor, such as an advanced solid state super-capacitor, is monitored and controlled independently. Although the individually monitored and controlled capacitor modules for these examples are illustrated as being located in a common housing, they may be located in multiple housings. The physical organization of the adaptive capacitors is a matter of design choice in view of the physical configuration of the capacitor bank. Pole-mounted versus substation capacitor banks, for example, may utilize different capacitor housing and mounting schemes.

FIG. 6 is a functional block diagram of a capacitor operation and maintenance system 60. A number of adaptive capacitors 61 may be organized into various combinations of capacitor units, multi-unit capacitor cells, and individual capacitors. Circuit breakers 62 for each electric power phase are utilized to momentarily isolate the adaptive capacitors 61 from the power grid during switching operations. The capacitor operation and maintenance system 60 largely eliminates longer capacitor outages experienced by conventional capacitor banks. The adaptive capacitor controllers 63 direct the operation of the adaptive capacitors 61 and circuit breakers 62 in accordance with control schemes for the adaptive capacitors, for example as described below with reference to FIGS. 8A-8F and FIGS. 9-12. The adaptive capacitor controllers 63 may be organized in any suitable physical configuration, such as local, remote, cloud-based, etc.

In the example illustrated by FIG. 6, the adaptive capacitor controllers 63 transmit capacitor data to alert indicators 64 and RTU 65. The alert indicators 64 typically include a local indicator panel and alert messages transmitted to responsible personnel. The RTU 65 relays the capacitor data on to a consolidated capacitor management system 66 providing centralized capacitor management for an electric utility system or a consortium of cooperating electric power entities. For example, the consolidated capacitor management system 66 may manage capacitor related functions for adaptive capacitors owned by a range of distributed load-side generators, industrial customers, and interconnected utilizers.

The consolidated capacitor management system 66 may perform a variety of consolidated capacitor related functions, such as capacitor outage avoidance, real-time adaptive capacitor monitoring, real-time adaptive capacitor operation, consolidated capacitor inventory, strategic capacitor procurement, strategic dispatch of repair crews, off-peak capacitor replacement, capacitor failure research, etc. Over time, the entity operating the consolidated capacitor management system 66 will collect a rich database of capacitor data and failure information for a large number of adaptive capacitors allowing research into causes and advance indicators of capacitor failure revealed by analysis of the consolidated capacitor data. This will allow the operator of the adaptive capacitor unit to predict capacitor failure and take corrective action prior to capacitor failure, thus reducing the level of reserve capacitor units required to attain a desired reliability level or extending the time between maintenance events. Analysis of consolidated capacitor data may also reveal recurring causes of capacitor failure, manufacturing defects, superior capacitor designs, and external factors correlated with capacitor failures leading to improved capacitor manufacturing, adoption of improved capacitor technologies, improved protection schemes, establishment of desired capacitor reserve levels and other best practices.

Figure 7:
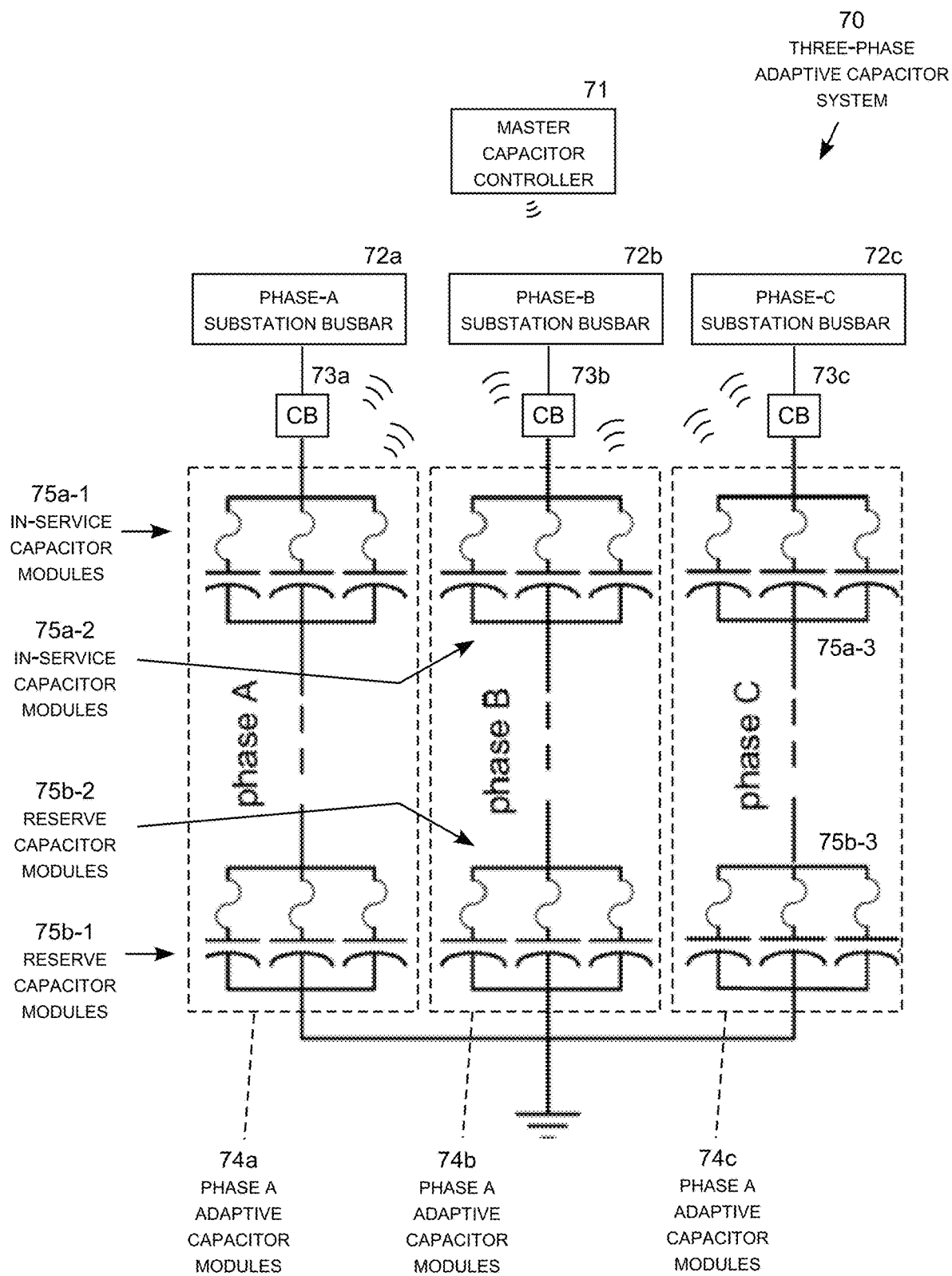
FIG. 7 is a functional block diagram of a three-phase adaptive capacitor system.

FIG. 7 is a functional block diagram of a three-phase adaptive capacitor system 70 controlled by a master capacitor controller 71. The adaptive capacitor system 70 is connected to a three-phase power line by way of the phase-A substation busbar 72a, phase-B substation busbar 72b, and phase-C substation busbar 72c.

Phase-A adaptive capacitors 74a are connected to the substation busbar 72a by way of a circuit breaker 73a, which communicates wirelessly with the master capacitor controller 71. Phase-A adaptive capacitors 74a also communicate wirelessly with the master capacitor controller 71. The phase-A adaptive capacitors 74a includes a group of series connected in-service capacitor modules 75a-1 and a group of series connected reserve capacitor modules 75a-2.

Phase-B adaptive capacitors 74b are connected to the substation busbar 72b by way of a circuit breaker 73b, which communicates wirelessly with the master capacitor controller 71. Phase-B adaptive capacitors 74a also communicate wirelessly with the master capacitor controller 71. The phase-B adaptive capacitors 74b include a group of series connected in-service capacitor modules 75b-1 and a group of series connected reserve capacitor modules 75b-2.

Similarly, phase-C adaptive capacitors 74c are connected to the substation busbar 72c by way of a circuit breaker 73c, which communicates wirelessly with the master capacitor controller 71. Phase-C adaptive capacitors 74c also communicate wirelessly with the master capacitor controller 71. The phase-C adaptive capacitor module 74c includes a group of series connected in-service capacitor modules 75c-1 and a group of series connected reserve capacitor modules 75c-2.

This arrangement allows the three-phase adaptive capacitor system 70 to provide on-demand reserve capacitor operation as described with reference to FIGS. 8A through 8D and FIGS. 9-11. This arrangement also provides for three-phase power factor correction taking into account underlying three-phase reactive load imbalances as described with reference to FIGS. 8E, FIG. 8F and FIG. 12. The various adaptive capacitor units allow in-service and reserve capacitor units to be switched on and off in response to reactive power changes in the underlying power load. As in conventional capacitor systems, three-phase groups of capacitor units are switched one or off as the need for phase-balanced capacitance changes in the underlying power load. The adaptive capacitor system provides additional functionality not provided by conventional capacitor system. For example, failed capacitor units are switched off, and replacement (typically reserve) capacitor units are switched on, as in-service capacitor units fail. In addition, capacitor units unbalanced across the phases may switched on or off in response to unbalanced reactive power needs in the underlying power load.

Figure 8A:
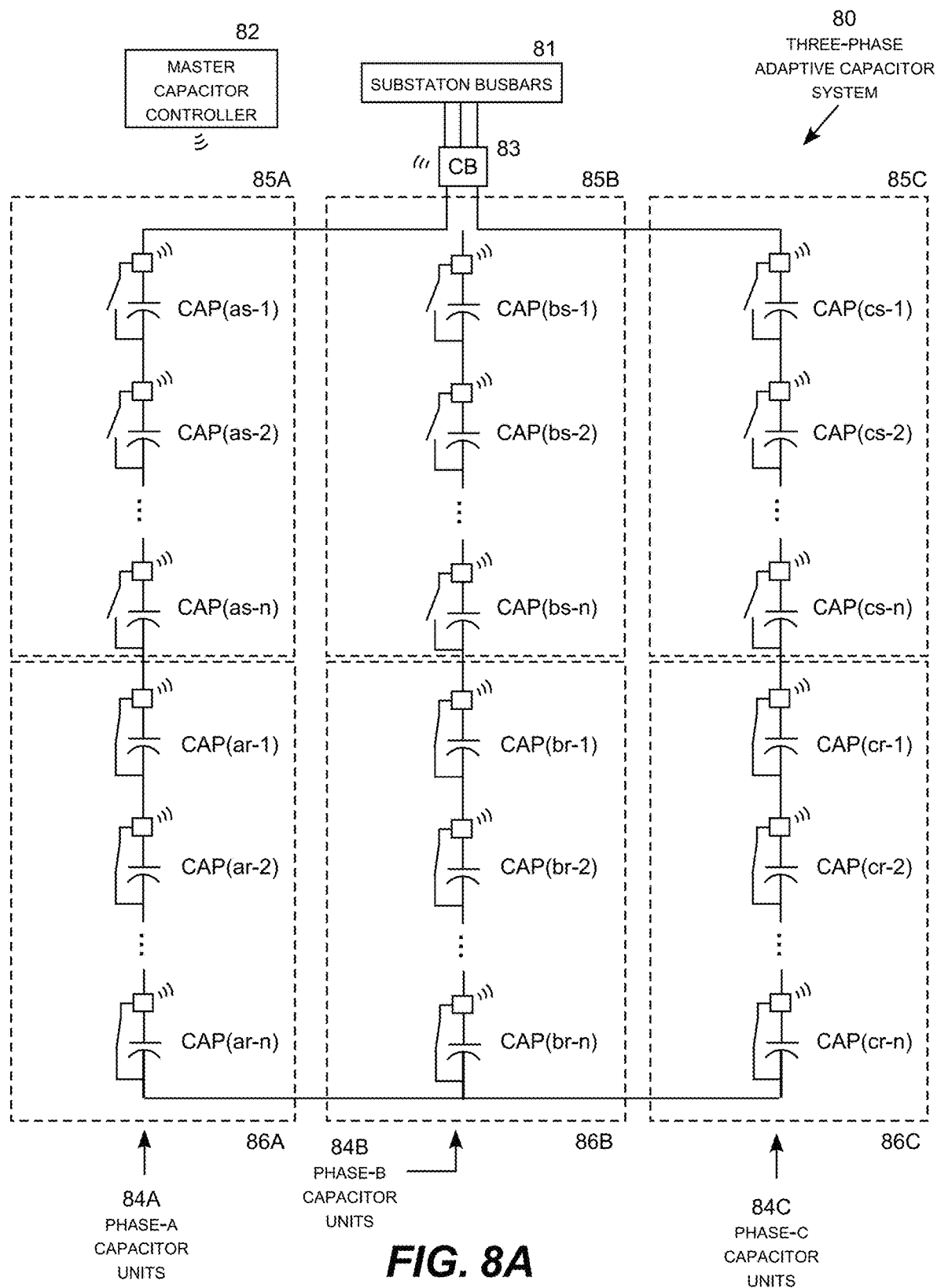
FIG. 8A is one-line diagram for a first state of the three-phase adaptive capacitor system.

FIG. 8A is one-line diagram for a first state of a three-phase adaptive capacitor system 80, which includes three-phase substation busbars 81, a master capacitor controller 82, and three-phase circuit breakers 83 in communication with the master controller 82. Phase-A capacitor units 84A, phase-B capacitor units 84B, and phase-C capacitor units 84C also communicate with the master controller 82. In this example, the phase-A capacitor units 84A include in-service capacitor units 85A and reserve capacitor units 86A. The phase-A in-service capacitor units 85A include a number of series-connected adaptive capacitors CAP(as-1) through CAP(as-n), while the reserve capacitor units 88A likewise include a number of series-connected adaptive capacitors CAP(ar-1) through CAP(ar-n). These capacitor units are described further with reference to FIGS. 3 and 4.

The phase-A in-service capacitor units 85A include a number of series-connected adaptive capacitors CAP(as-1) through CAP(as-n), while the phase-A reserve capacitor units 86A include a number of series-connected adaptive capacitors CAP(ar-1) through CAP(ar-n). The phase-B in-service capacitor units 85B include a number of series-connected adaptive capacitors CAP(bs-1) through CAP(bs-n), while the phase-B reserve capacitor units 86A include a number of series-connected adaptive capacitors CAP(br-1) through CAP(br-n). Similarly, the phase-C in-service capacitor units 85C include a number of series-connected adaptive capacitors CAP(cs-1) through CAP(cs-n), while the phase-C reserve capacitor units 86A include a number of series-connected adaptive capacitors CAP(cr-1) through CAP(cr-n). These capacitor units report measured capacitor values or parameters based on the measured capacitor values to the master capacitor module 82, while switching on and off the capacitor units in accordance with instructions from the master capacitor module 82. The following examples utilize configuration to illustrate specific functionality of the system, where FIG. 8A illustrates the initial or default state of the system.

Figure 8B:
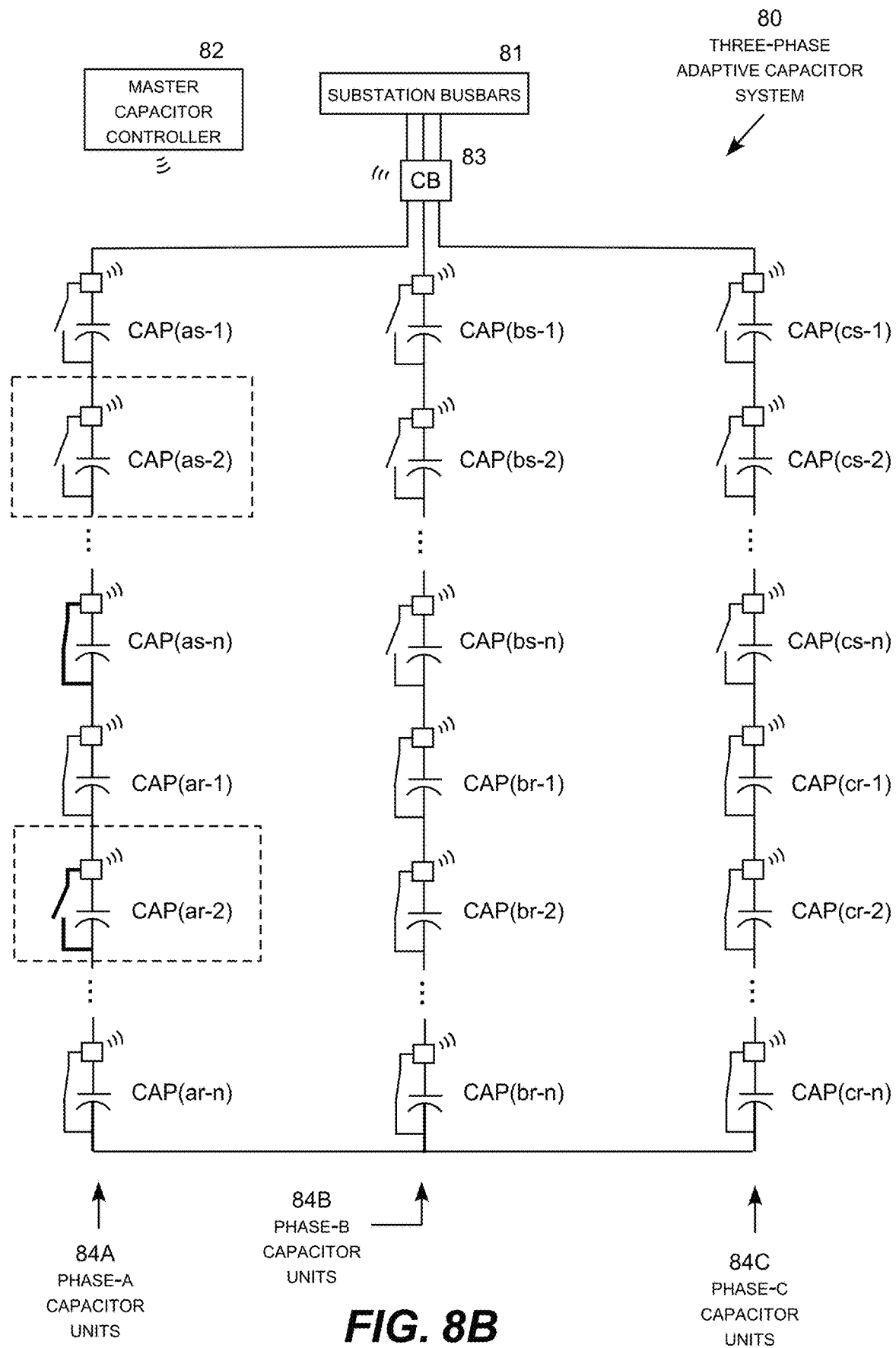
FIG. 8B is one-line diagram for a second state of the three-phase adaptive capacitor system.

FIG. 8B is one-line diagram for a second state of the three-phase adaptive capacitor system 80. In this example, the first phase-A in-service capacitor unit CAP(as-1) has failed, and is therefore taken out of service by closing the adaptive capacitor switch for that capacitor unit. The failed phase-A capacitor unit CAP(as-1) is replace by the first reserve capacitor unit CAP(ar-1) by closing the adaptive capacitor switch for that capacitor unit. This procedure is repeated for other capacitor units as capacitor units fail until the failed capacitor units are eventually replaced during a convenient off-peak period, The adaptive capacitor switches are then reset for the new initial state of the system.

Figure 8C:
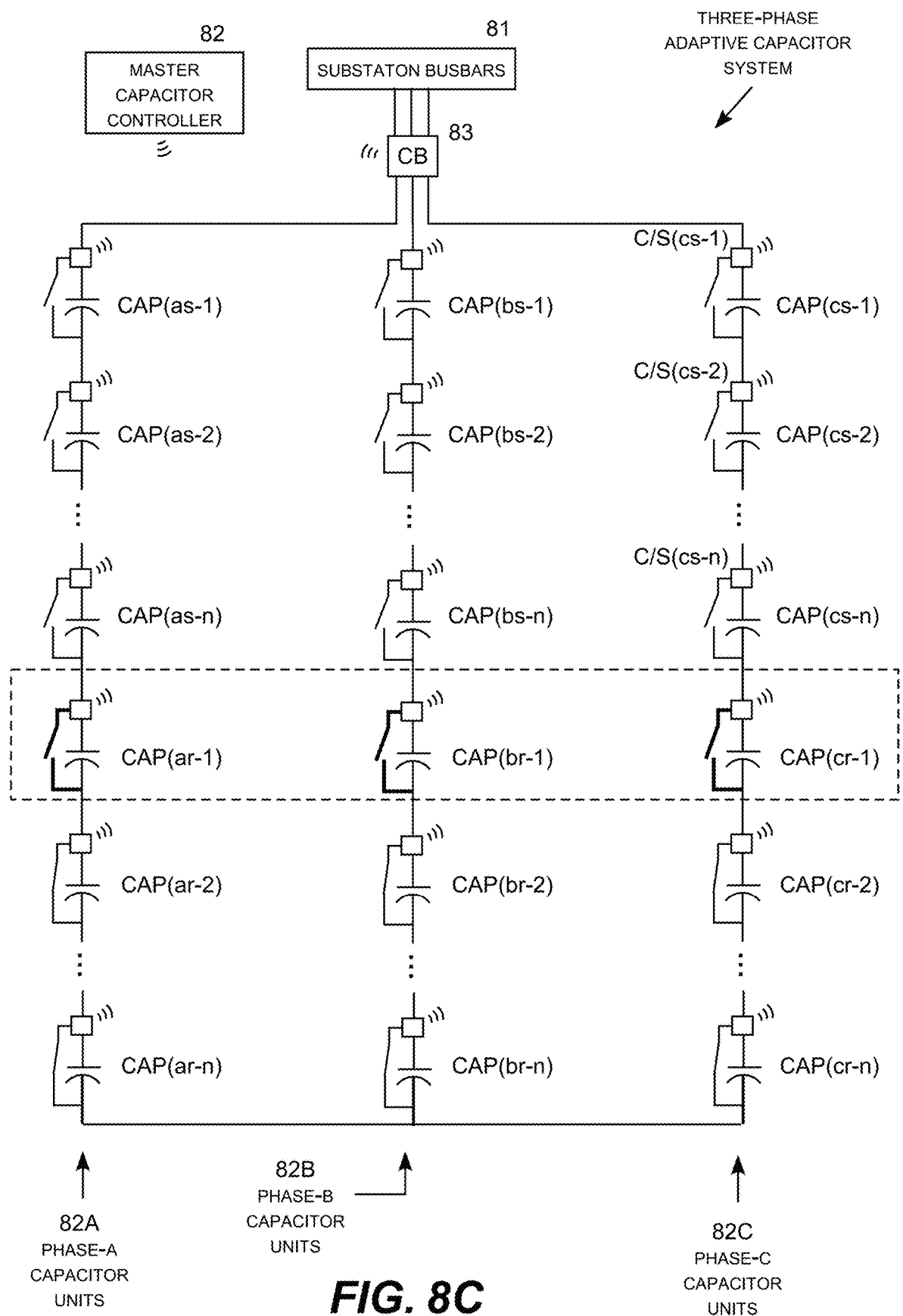
FIG. 8C is one-line diagram for a third state of the three-phase adaptive capacitor system.

FIG. 8C is one-line diagram for a third state of the three-phase adaptive capacitor system 80. In this example, the master controller or a consolidated capacitor management system in communication with the master controller conducts additive power factor correction. In this example, it is determined that the power factor on the power line has dropped in a lagging direction (current lagging voltage) to the point justifying addition of a capacitor unit to each electric power phase. The adaptive capacitor switches for the phase-A reserve capacitor unit CAP(ar-1), phase-B reserve capacitor unit CAP(br-1), and phase-C reserve capacitor unit CAP(cr-1) are therefore opened bringing these capacitor units into service to provide power factor correction in the leading direction. This procedure is repeated to add additional balanced capacitance to the phases in response to the detected need for additional power factor correction in the leading direction.

Figure 8D:
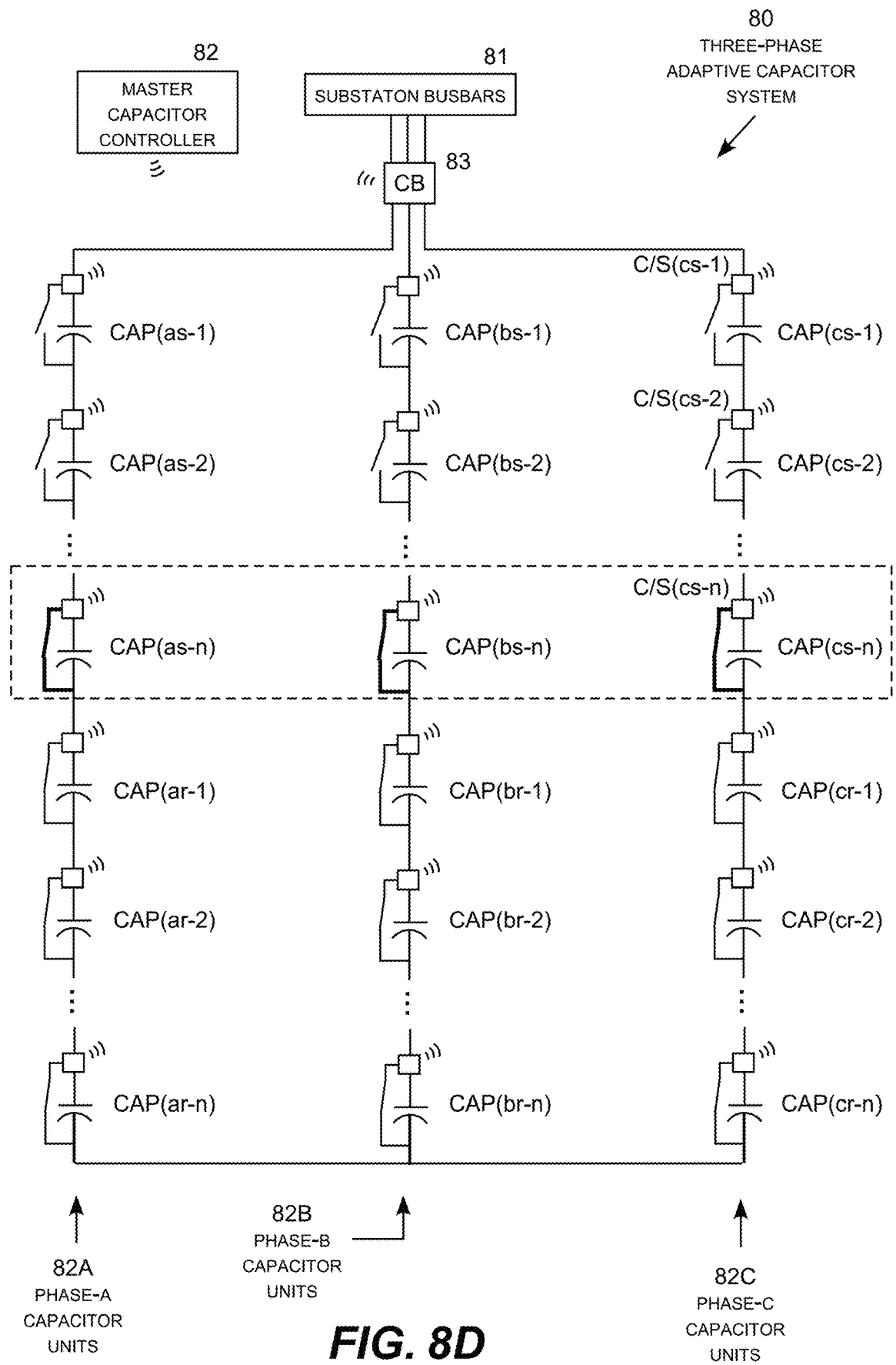
FIG. 8D is one-line diagram for a fourth state of the three-phase adaptive capacitor system.

FIG. 8D is one-line diagram for a fourth state of the three-phase adaptive capacitor system 80. In this example, the master controller or a consolidated capacitor management system in communication with the master controller conducts subtractive power factor correction. In this example, it is determined that the power factor on the power line has dropped in a leading direction (current leading voltage) to the point justifying removal of a capacitor unit from each electric power phase. The adaptive capacitor switches for the phase-A in-service capacitor CAP(as-1), phase-B in-service capacitor CAP(bs-1), and phase-C in-service capacitor CAP(cs-1) are therefore closed removing these capacitor units from service to provide power factor correction in the lagging direction. This procedure is repeated to remove additional capacitance from the phases in response to the detected need for additional power factor correction in the lagging direction.

Figure 8E:
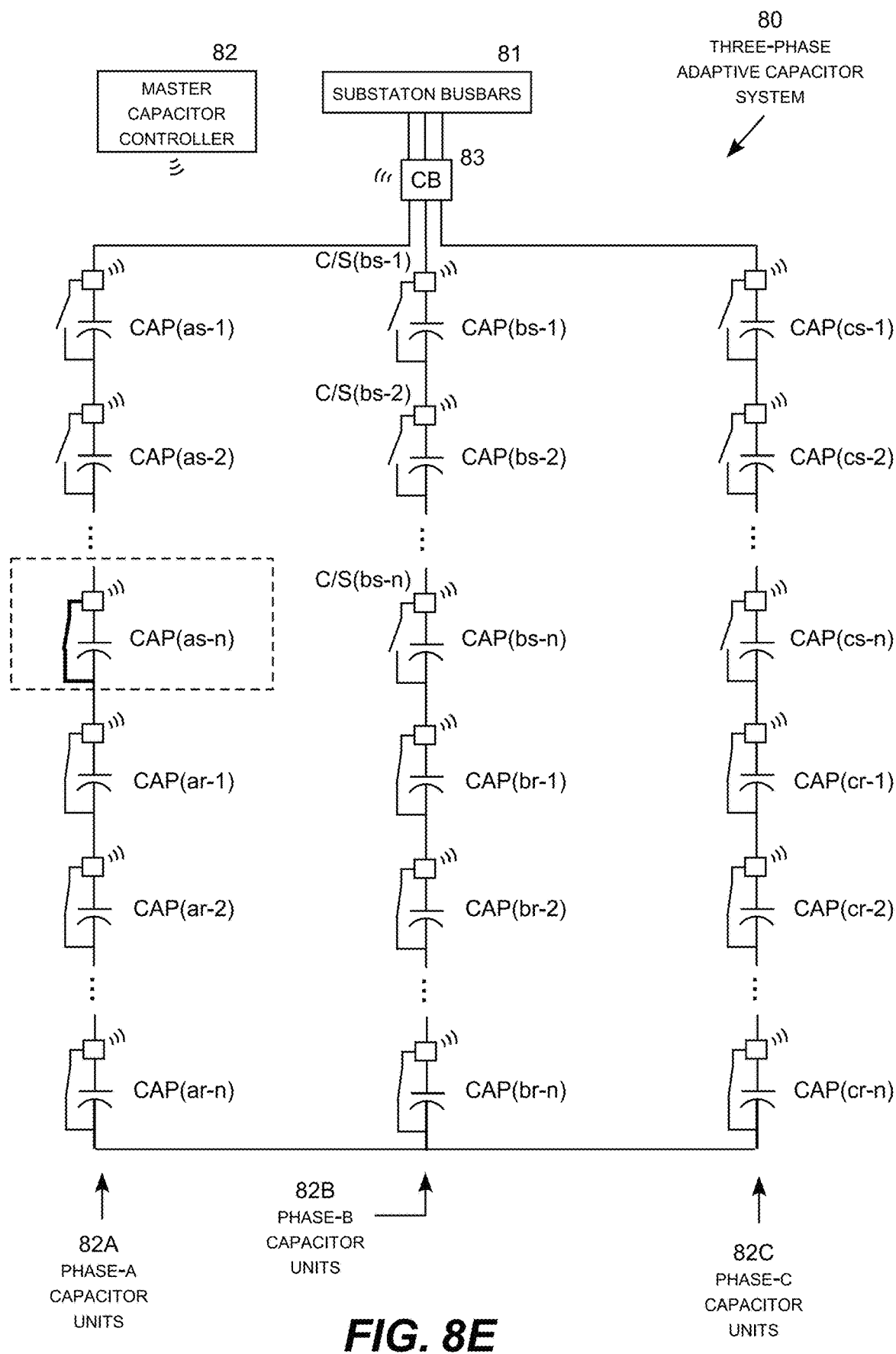
FIG. 8E is one-line diagram for a fifth state of the three-phase adaptive capacitor system.

FIG. 8E is one-line diagram for a fifth state of the three-phase adaptive capacitor system 80. In this example, the master controller or a consolidated capacitor management system in communication with the master controller conducts unbalances subtractive power factor correction only affecting electric power phase-A. In this example, it is determined that the power factor on phase-A of the power line has dropped in a leading direction (current leading voltage) to the point justifying removal of a capacitor unit from only phase-A. The adaptive capacitor switches for the phase-A in-service capacitor CAP(as-1) is therefore closed removing this capacitor unit from service to provide unbalanced power factor correction in the lagging direction only affecting phase-A. This procedure is repeated to remove additional capacitance from phase-A in response to the detected need for additional power factor correction for phase-A in the lagging direction. Similar unbalanced power factor correction in the lagging direction may be performed to the other phases or combinations of phases, as needed.

Figure 8F:
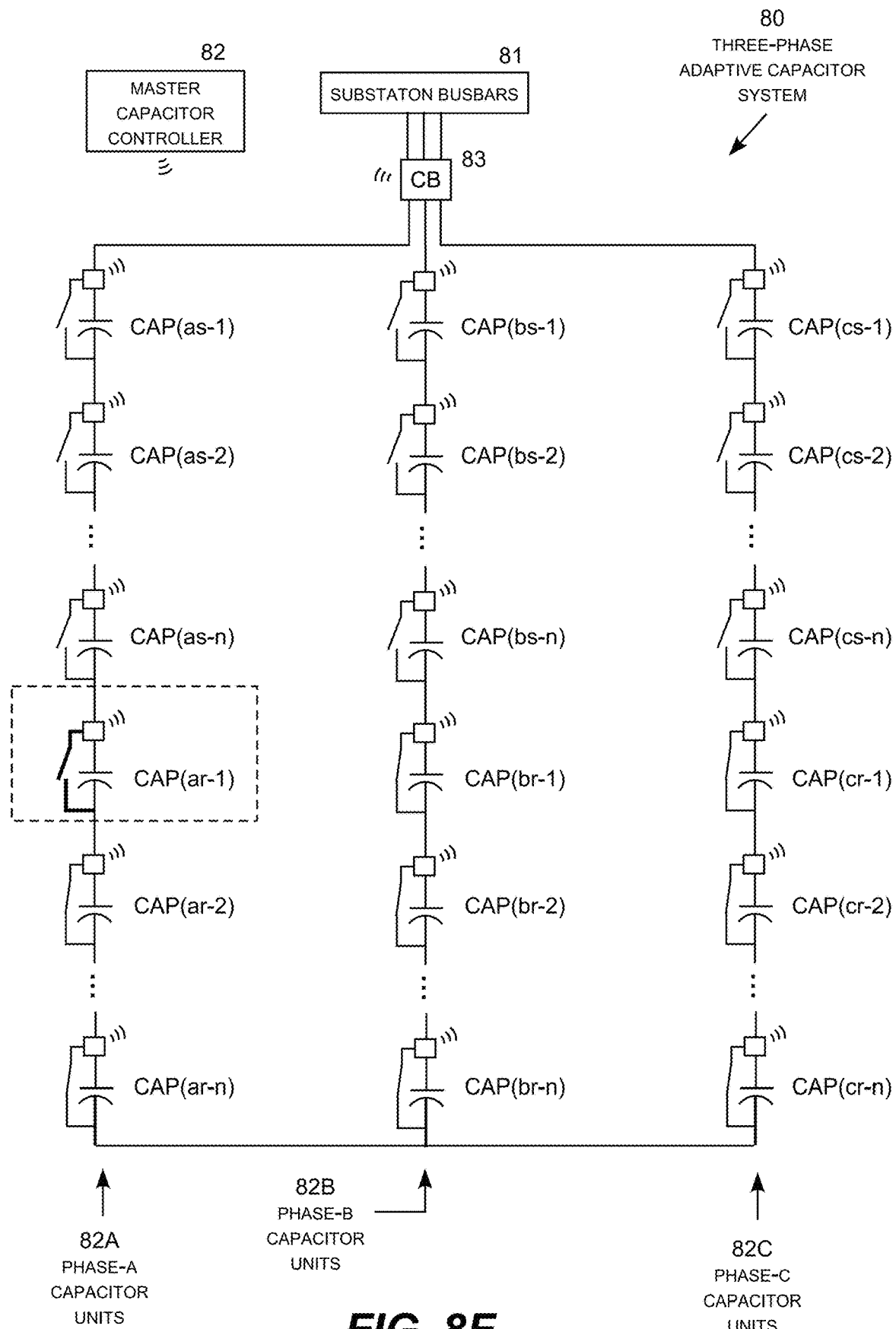
FIG. 8F is one-line diagram for a sixth state of the three-phase adaptive capacitor system.

FIG. 8F is one-line diagram for a sixth state of the three-phase adaptive capacitor system. In this example, the master controller or a consolidated capacitor management system in communication with the master controller conducts unbalanced additive power factor correction only affecting electric power phase-A. In this example, it is determined that the power factor on phase-A of the power line has dropped in a lagging direction (current lagging voltage) to the point justifying addition of a capacitor unit to only phase-A. The adaptive capacitor switches for the phase-A reserve capacitor CAP(ar-1) is therefore closed removing this capacitor unit from service to provide unbalanced power factor correction in the leading direction only affecting phase-A. This procedure is repeated to add additional capacitance to phase-A in response to the detected need for additional power factor correction for phase-A in the leading direction. Similar unbalanced power factor correction in the leading direction may be performed to the other phases or combinations of phases, as needed.

Those skilled in electric power distribution will appreciate that power factor correction in the leading direction as illustrated by FIG. 8C typically occurs during high load periods as inductive loads, such as air conditioners, motors and the like come online. Later in the day, power factor correction in the lagging direction as illustrated by FIG. 8D typically occurs as the inductive load decreases. While conventional capacitors systems operate in this load-following manner, they do not provide reserve capacitor operation replacing failed capacitor units as illustrated by FIG. 8B. Conventional capacitors also fail to provide unbalanced power factor correction, as needed, as illustrated by FIGS. 8E and 8F.

FIGS. 9-12 illustrate logic flow diagrams for the adaptive capacitor system 80 in FIGS. 8A-8F. In these logic flow diagrams, optional steps are indicated by dashed boxes. Specifically, the dashed boxes illustrating circuit breaker switching are optional and may not be implemented depending on the type of switch, capacitor switching operation, or connected loads. In some cases, circuit breaker switching may be utilized for some of the switching procedures (e.g., replacement of failed capacitor units) but not others. Circuit breaker switching is therefore illustrated as optional.

Figure 9:
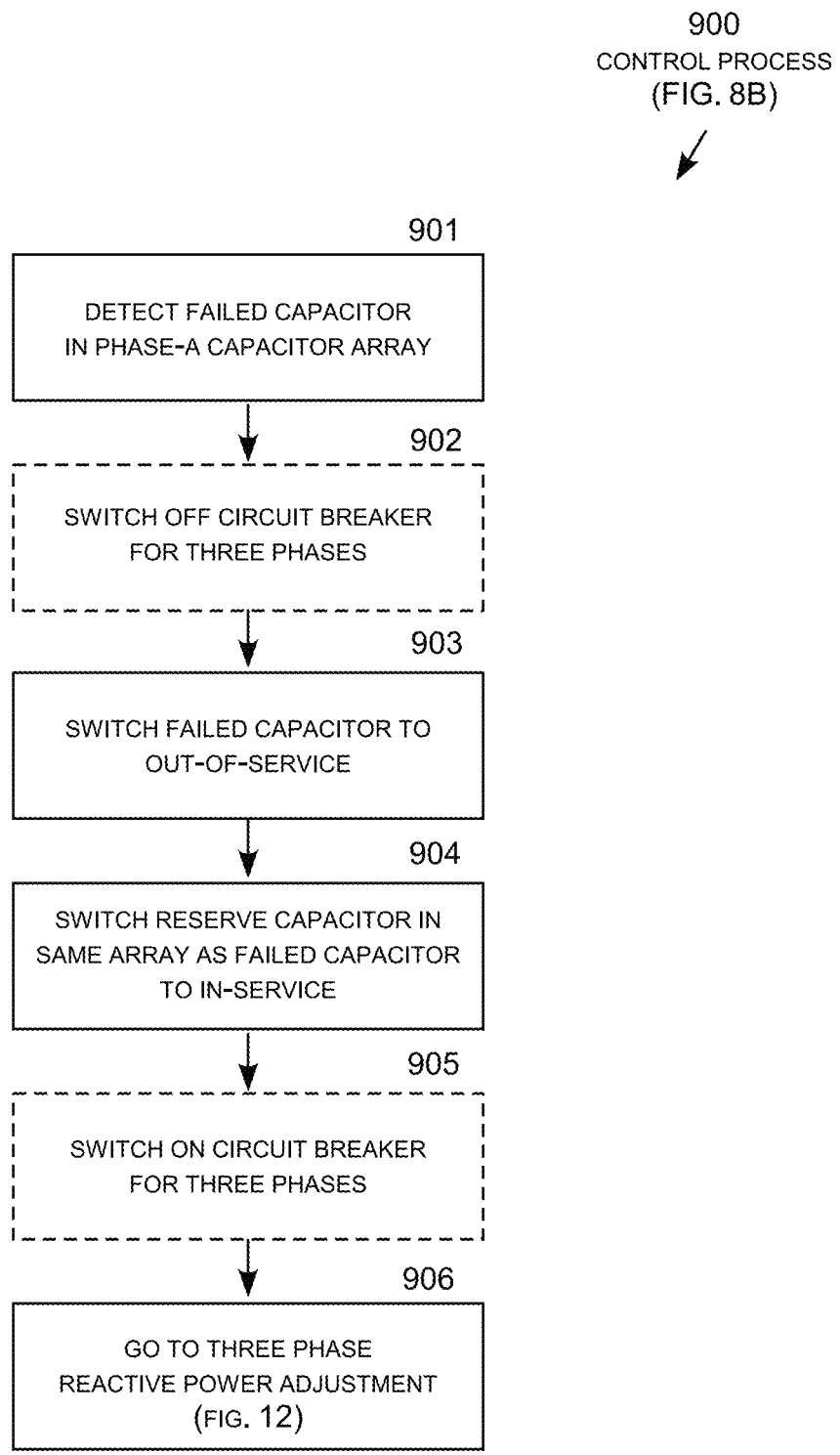
FIG. 9 is a logic flow diagram for a first control process for the adaptive capacitor system.

FIG. 9 is a logic flow diagram for a first control process 900 for the adaptive capacitor system 80C, which corresponds to the system state illustrated by FIG. 8B. In step 901, the capacitor controller detects a failed capacitor unit. Although the capacitor failure could occur for any electric power phase, for this representative example the failed capacitor unit occurs in phase-A capacitor array. Step 901 is followed by step 902, in which the capacitor controller switches off the circuit breakers for all three phases to prevent unintentional tripping due to the unbalanced reactive power condition or the ensuing capacitor switching procedure. Step 902 is followed by step 903, in which the capacitor controller switches the failed capacitor unit out-of-service (i.e., switches closed the adaptive capacitor switch for the failed capacitor unit to remove it from service). Step 903 is followed by step 904, in which the capacitor controller switches a reserve capacitor unit in same array as the failed capacitor, in this example Phase-A, to its in-service state (i.e., switches open the adaptive capacitor switch for the reserve capacitor to place it in service). Step 904 is followed by step 905, in which the capacitor controller switches on the circuit breakers for all three phases. Step 905 is followed by step 906, in which the capacitor controller checks for and corrects, as needed, unbalanced reactive power as described with reference to FIG. 12.

Figure 10:
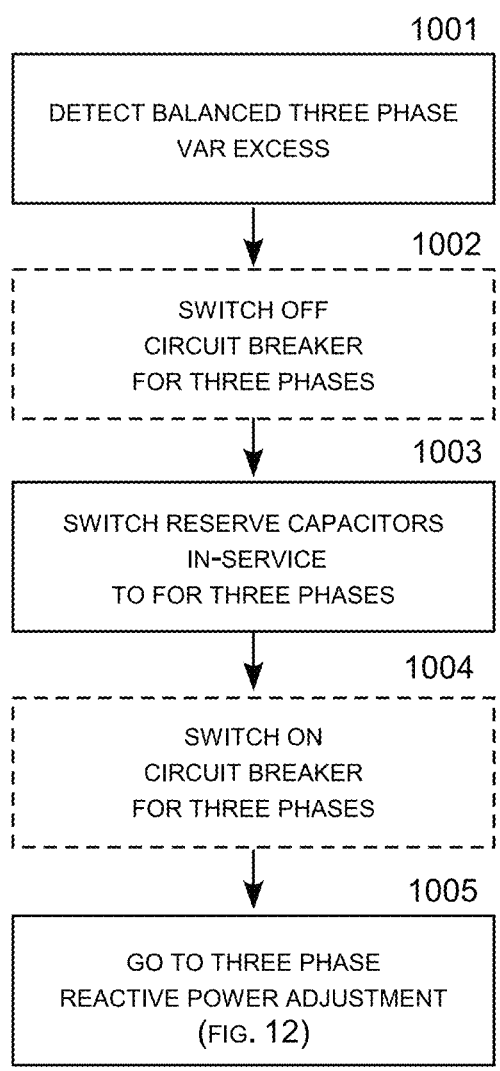
FIG. 10 is a logic flow diagram for a second control process for the adaptive capacitor system.

FIG. 10 is a logic flow diagram for a second control process for the adaptive capacitor system, which corresponds to the system state illustrated by FIG. 8C. In step 1001, the capacitor controller detects a balanced VAR excess for all three phases sufficient to justify adding a capacitor unit to each phase. Step 1001 is followed by step 1002, in which the capacitor controller switches off the circuit breakers for all three phases to prevent unintentional tripping due to the ensuing capacitor switching procedure. Step 1002 is followed by step 1003, in which the capacitor controller switches reserve capacitor units to in-service for each electric power phase (i.e., switches open the adaptive capacitor switches for the reserve capacitor units to place them in service). Step 1003 is followed by step 1004, in which the capacitor controller switches on the circuit breakers for all three phases. Step 1004 is followed by step 1005, in which the capacitor controller checks for and corrects, as needed, unbalanced reactive power as described with reference to FIG. 12.

Figure 11:
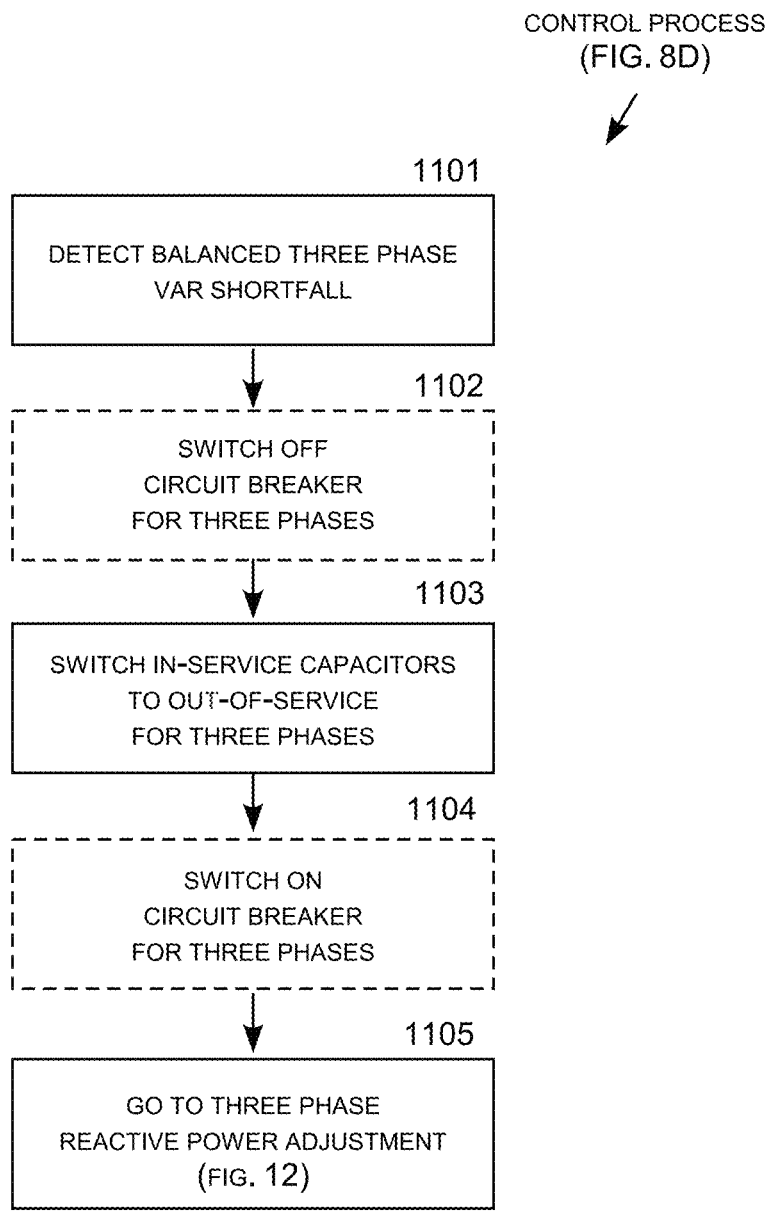
FIG. 11 is a logic flow diagram for a third control process for the adaptive capacitor system.

FIG. 11 is a logic flow diagram for a third control process for the adaptive capacitor system, which corresponds to the system state illustrated by FIG. 8D. In step 1101, the capacitor controller detects a balanced VAR shortfall for all three phases sufficient to justify removing a capacitor unit from each phase. Step 1101 is followed by step 1002, in which the capacitor controller switches off the circuit breakers for all three phases to prevent unintentional tripping due to the ensuing capacitor switching procedure. Step 1102 is followed by step 1103, in which the capacitor controller switches in-service capacitor units out-of-service for each electric power phase (i.e. closes the adaptive capacitor switches for the in-service capacitor units to remove them from service). Step 1103 is followed by step 1104, in which the capacitor controller switches on the circuit breakers for all three phases. Step 1104 is followed by step 1105, in which the capacitor controller checks for and corrects, as needed, unbalanced reactive power as described with reference to FIG. 12.

Figure 12:
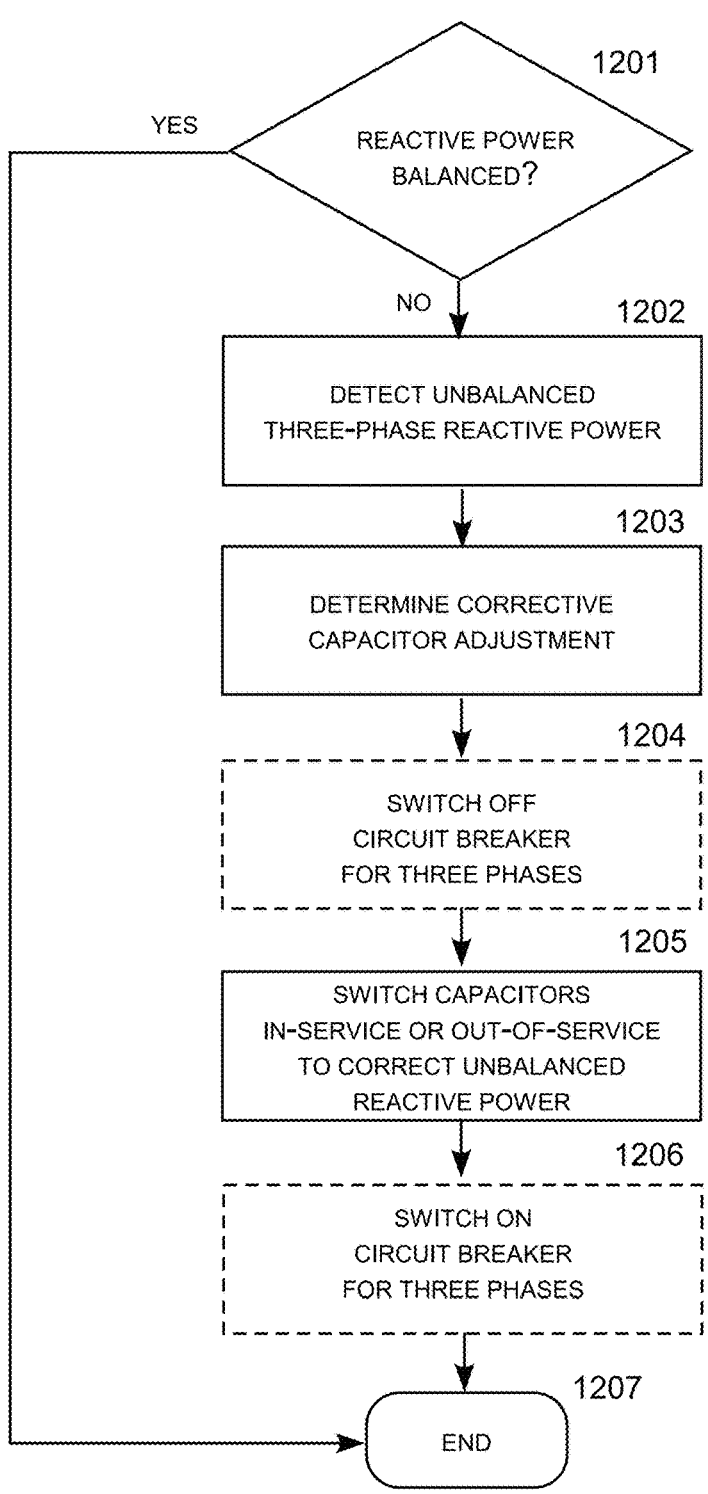
FIG. 12 is a logic flow diagram for a fourth control process for the adaptive capacitor system.

FIG. 12 is a logic flow diagram 1200 for a fourth control process for the adaptive capacitor system, in which it performs unbalanced power factor correction. This process may be performed following capacitor switching, as shown in FIGS. 9-11, or as a matter of ongoing practice during electric power service. In step 1201, the capacitor controller determines whether a reactive power imbalance warranting correction has occurred. If a reactive power imbalance warranting correction has not occurred, the "yes" is followed to the end step 1207. If a reactive power imbalance warranting correction has occurred, the "no" is followed to the step 1202, in which the capacitor controller determines the corrective capacitor adjustment, which may involve an unbalanced capacitor addition or removal from one or more electric power phases. Step 1202 is followed by step 1203, in which the capacitor controller switches off the circuit breakers for all three phases to prevent unintentional tripping due to the ensuing capacitor switching procedure. Step 1203 is followed by step 1204, in which the capacitor controller switches on and/or off capacitor units to implement the desired corrective capacitor adjustment. Step 1204 is followed by step 1205, in which in-service or out-of-service capacitors are switched to correct the unbalanced reactive power. Step 1205 is followed by step 1206, in which the capacitor controller switches on the circuit breakers for all three phases. Step 1206 is followed by the "end" step 1207.

It should be noted that the functionality of the capacitor controller described above may be performed manually, autonomously by the adaptive capacitor units operating in a peer-to-peer or mesh mode, by a master controller for the three-phase adaptive capacitor bank, or by a consolidated controller for multiple capacitor banks. That is, adaptive capacitor control may be manual or automatic, local or remote, consolidated or distributed, as desired in view of the physical and electrical configuration of the underlying electric power system. In the case of manual control, the manual control procedures are aided by the display of capacitor failure alerts, the measured parameters by the various adaptive controller-sensor units, and other parameters based on the measured pleasured parameters, such as VAR value and power factor values at various locations in the consolidated capacitor management system and the underlying electric power system.

The functionality described in this disclosure may be performed by computer-operated controllers, which may be special purpose or general purpose hardware with specialized software, as will be familiar to those skilled in compute architecture. The described functionality is not dependent on any particular type of computing, storage or communication technology. In general, a computer-operated controller includes at least a processor, communication interfaces, and data memory storing non-transitory computer instructions which, when executed by the processor, cause the controller perform the described functionality. A controller may be local or remote from the controlled equipment; centralized, distributed or cloud-based. Any type of suitable special or general purpose computing, data storage and communication technology currently existing and developed in the future may be utilized. While any type of suitable communication technology may be utilized, many electric utilities use communication systems known as Supervisory Control and Data Acquisition (SCADA) systems to integrate their geographically disperse equipment, which may be utilized for the described communication and integration functions. The described functionality will be understood to be computerized unless manual operation is expressly described or apparent from the context.

The drawings are in simplified form and are not to precise scale unless specifically indicated. The words "couple" and similar terms do not necessarily denote direct and immediate connections, but also include connections through intermediate elements or devices. Certain descriptors, such "first" and "second," "top and bottom," "upper" and "lower," "inner" and "outer," or similar relative terms may be employed to differentiate structures from each other. These descriptors are utilized as a matter of descriptive convenience and are not employed to implicitly limit the invention to any particular position or orientation. It will also be understood that specific embodiments may include a variety of features and options in different combinations, as may be desired by different users. Practicing the invention does not require utilization of all, or any particular combination, of these specific features or options.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermediate components. Likewise, any two components so associated can also be viewed as being "connected", or "coupled", to each other to achieve the desired functionality, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

The invention claimed is:

1. An adaptive electric power capacitor system, comprising:
   a plurality of adaptive capacitors, each comprising a capacitor module, a capacitor switch operatively connected to the capacitor module, and a controller-sensor for monitoring capacitor data of the capacitor module and controlling the capacitor switch to selectively switch the capacitor module between an in-service state and an out-of-service state, one or more of the adaptive capacitors operated as in-service adaptive capacitors normally in their in-service states, and one or more of the adaptive capacitors operated as reserve adaptive capacitors normally in their out-of-service states; and
   a capacitor controller operative to:
      receive the capacitor data for the in-service adaptive capacitors;
      based on the capacitor data, determine that one of the in-service adaptive capacitors has failed;
      cause the controller-sensor for the failed adaptive capacitor module to switch the failed capacitor module to the out-of-service state; and
      cause the controller-sensor for a selected reserve adaptive capacitor module to switch its capacitor module to switch the reserve adaptive capacitor module to the in-service state to replace the failed adaptive capacitor module.

2. The adaptive electric power capacitor system of claim 1, further comprising a circuit breaker controlling electric power delivery to the plurality of adaptive capacitors, the capacitor controller operative to:

open the circuit breaker before replacing the failed capacitor module with the reserve capacitor module;

close the circuit breaker after replacing the failed capacitor module with the reserve capacitor module.

3. The adaptive electric power capacitor system of claim 1, further comprising a three-phase circuit breaker controlling electric power delivery to the plurality of adaptive capacitors, the capacitor controller operative to:

open the three-phase circuit breaker before replacing the failed capacitor module with the reserve capacitor module;

close the three-phase circuit breaker after replacing the failed capacitor module with the reserve capacitor module.

4. The adaptive electric power capacitor system of claim 1, wherein each controller-sensor communicates wirelessly with the capacitor controller.

5. The adaptive electric power capacitor system of claim 1, wherein each capacitor module comprises:

a capacitor unit comprising a plurality of capacitor packs, each capacitor pack comprising a plurality of capacitor cells, each capacitor cell comprising multiple capacitors.

6. The adaptive electric power capacitor system of claim 1, wherein each controller-sensor communicates capacitor status data directly or indirectly to an alert device that displays indications of the capacitor status data.

7. The adaptive electric power capacitor system of claim 1, wherein each controller-sensor communicates the capacitor data directly or indirectly to a consolidated capacitor management system that schedules replacement of the failed adaptive capacitor module during an off-peak period.

8. A three-phase adaptive electric power capacitor system, comprising:

for each electric power phase, a plurality of adaptive capacitors, each comprising a capacitor module, a capacitor switch operatively connected to the capacitor module, and a controller-sensor for monitoring capacitor data of the capacitor module and controlling the capacitor switch to selectively switch the capacitor module between an in-service state and an out-of-service state, one or more of the adaptive capacitors operated as in-service adaptive capacitors normally in their in-service states, and one or more of the adaptive capacitors operated as reserve adaptive capacitors normally in their out-of-service states;

a capacitor controller operative to:

receive the capacitor data for the in-service adaptive capacitors;

based on the capacitor data, determine that one of the in-service adaptive capacitors has failed;

cause the controller-sensor for the failed adaptive capacitor module to switch the failed capacitor module to the out-of-service state; and cause the controller-sensor for a selected reserve adaptive capacitor module to switch its capacitor module to switch the reserve adaptive capacitor module to the in-service state to replace the failed adaptive capacitor module.

9. The three-phase adaptive electric power capacitor system of claim 8, further comprising a three-phase circuit breaker controlling electric power delivery to the plurality of adaptive capacitors, the capacitor controller operative to:

open the three-phase circuit breaker before replacing the failed capacitor module with the reserve capacitor module;

close the three-phase circuit breaker after replacing the failed capacitor module with the reserve capacitor module.

10. The three-phase adaptive electric power capacitor system of claim 8, wherein each controller-sensor communicates wirelessly with the capacitor controller.

11. The three-phase adaptive electric power capacitor system of claim 8, wherein each capacitor module comprises:

a capacitor unit comprising a plurality of capacitor packs, each capacitor pack comprising a plurality of capacitor cells, each capacitor cell comprising multiple capacitors.

12. The three-phase adaptive electric power capacitor system of claim 8, wherein each controller-sensor communicates capacitor status data directly or indirectly to an alert device that displays indications of the capacitor status data.

13. The three-phase adaptive electric power capacitor system of claim 8, wherein each controller-sensor communicates the capacitor data directly or indirectly to a consolidated capacitor management system that schedules replacement of the failed adaptive capacitor module during an off-peak period.

14. A three-phase adaptive electric power capacitor system, comprising:

for each electric power phase, a plurality of adaptive capacitors, each comprising a capacitor module, a capacitor switch operatively connected to the capacitor module, and a controller-sensor for monitoring capacitor data of the capacitor module and controlling the capacitor switch to selectively switch the capacitor module between an in-service state and an out-of-service state, one or more of the adaptive capacitors operated as in-service adaptive capacitors normally in their in-service states, and one or more of the adaptive capacitors operated as reserve adaptive capacitors normally in their out-of-service states;

a capacitor controller operative to:

receive the capacitor data for the in-service adaptive capacitors for each electric power phase;

based on the capacitor data, determine an unbalanced reactive power state has occurred among the electric power phases; and cause the controller-sensor for one or more adaptive capacitor modules to switch to provide three-phase power factor correction to mitigate the unbalanced reactive power state.

15. The three-phase adaptive electric power capacitor system of claim 14, further comprising a three-phase circuit breaker controlling electric power delivery to the plurality of adaptive capacitors, the capacitor controller operative to:

open the three-phase circuit breaker before replacing the failed capacitor module with the reserve capacitor module;

close the three-phase circuit breaker after replacing the failed capacitor module with the reserve capacitor module.

16. The three-phase adaptive electric power capacitor system of claim 14, wherein each controller-sensor communicates wirelessly with the capacitor controller.

17. The three-phase adaptive electric power capacitor system of claim 14, wherein each capacitor module comprises:

a capacitor unit comprising a plurality of capacitor packs, each capacitor pack comprising a plurality of capacitor cells, each capacitor cell comprising multiple capacitors.

18. The three-phase adaptive electric power capacitor system of claim 14, wherein each controller-sensor communicates capacitor status data directly or indirectly to an alert device that displays indications of the capacitor status data.

19. The three-phase adaptive electric power capacitor system of claim 14, wherein the capacitor controller is further operative to:
   based on the capacitor data, determine that one of the in-service adaptive capacitors has failed;
   cause the controller-sensor for the failed adaptive capacitor module to switch the failed capacitor module to the out-of-service state; and
   cause the controller-sensor for a selected reserve adaptive capacitor module to switch the reserve capacitor module to the in-service state to replace the failed adaptive capacitor module.

20. The three-phase adaptive electric power capacitor system of claim 19, wherein each controller-sensor communicates the capacitor data directly or indirectly to a consolidated capacitor management system that schedules replacement of the failed adaptive capacitor module during an off-peak period.

\* \* \* \* \*